United States Patent
Ding et al.

(10) Patent No.: US 10,113,133 B2
(45) Date of Patent: Oct. 30, 2018

(54) RANDOM COPOLYMERS OF ACRYLATES AS POLYMERIC FRICTION MODIFIERS, AND LUBRICANTS CONTAINING SAME

(71) Applicant: Afton Chemical Corporation, Richmond, VA (US)

(72) Inventors: Jiang Ding, Glen Allen, VA (US); Joseph Remias, Woodbridge, VA (US)

(73) Assignee: AFTON CHEMICAL CORPORATION, Richmond, VA (US)

(*) Notice: Subject to any disclaimer, the term of this patent is extended or adjusted under 35 U.S.C. 154(b) by 0 days.

(21) Appl. No.: 15/138,572

(22) Filed: Apr. 26, 2016

(65) Prior Publication Data

US 2017/0306259 A1    Oct. 26, 2017

(51) Int. Cl.
| | |
|---|---|
| C10M 135/22 | (2006.01) |
| C10M 135/28 | (2006.01) |
| C10M 145/14 | (2006.01) |
| C08F 220/68 | (2006.01) |
| C08F 220/10 | (2006.01) |

(52) U.S. Cl.
CPC ......... *C10M 145/14* (2013.01); *C08F 220/10* (2013.01); *C08F 220/68* (2013.01); *C10M 2209/084* (2013.01)

(58) Field of Classification Search
CPC .............. C10M 145/14; C10M 2209/084
USPC ........................................................ 508/469
See application file for complete search history.

(56) References Cited

U.S. PATENT DOCUMENTS

| | | | |
|---|---|---|---|
| 8,101,559 B2 | 1/2012 | Mueller et al. | |
| 8,288,327 B2 | 10/2012 | Dardin et al. | |
| 8,507,422 B2 | 8/2013 | Price et al. | |
| 8,722,601 B2 | 5/2014 | Mueller et al. | |
| 8,822,393 B2 | 9/2014 | Knotts et al. | |
| 2006/0189490 A1 | 8/2006 | Dardin et al. | |
| 2010/0167970 A1* | 7/2010 | Stoehr ................ | B01F 17/0028 508/469 |
| 2012/0202723 A1 | 8/2012 | Abbey et al. | |
| 2014/0179578 A1 | 6/2014 | Tsou et al. | |

OTHER PUBLICATIONS

International Search Report and Written Opinion for related International Application No. PCT/US2017/028104 dated May 15, 2017, 8 pages.

* cited by examiner

*Primary Examiner* — Prem C Singh
*Assistant Examiner* — Francis C Campanell
(74) *Attorney, Agent, or Firm* — Mendelsohn Dunleavy, P.C.

(57) ABSTRACT

A random copolymer suitable for reducing friction in lubricant compositions is disclosed. The random copolymer can include a short chain acrylate, a long chain acrylate, and a polar acrylate. The random copolymer can have a ratio of short chain acrylate to long chain acrylate of 0 to 2, and a molecular weight number of 1000 to 10000. The disclosure can include a lubricant containing a base oil and the random copolymer. A process for preparing the random copolymer and polymeric friction modifiers is also disclosed.

30 Claims, 5 Drawing Sheets

RANDOM COPOLYMERS OF ACRYLATES AS POLYMERIC FRICTION MODIFIERS, AND LUBRICANTS CONTAINING SAME

TECHNICAL FIELD

The various embodiments of the disclosure relate generally to random copolymers and polymeric compositions containing polyacrylates, polymeric friction modifiers containing polyacrylates, lubricant compositions containing the same, and methods of making and using the same.

BACKGROUND

The efficiency and operation of engines, gearboxes and other systems in the automotive industry relies on maintaining effective lubrication and friction resistance. A principle consideration for engine oils is to prevent wear and seizure of parts in the engine. Lubricated engine parts are mostly in a state of fluid lubrication, but valve systems and top and bottom dead centers of pistons are likely to be in a state of boundary lubrication. The friction between these parts in the engine may cause significant energy losses and thereby reduce fuel efficiency. Being able to identify compositions that operate effectively in both the fluid and boundary friction portions of the Stribeck curve is thus an ongoing challenge in performance lubricants.

Small organic molecules have been incorporated into lubricants to improve boundary friction, but are ineffective in the thin film friction region. Alternative, polymeric compounds have been shown to function in the fluid friction curve. Some recent evidence has shown that multifunctional polymeric additives provide improvements on thin film friction region. For example, Guerbet polyols, US Patent Publication No. 2012/0202723, having branched hydrocarbon chains and hydroxyl functionality have been developed that demonstrate an improved friction resistance. However, these compounds can be hampered by cost, availability, process complexity and limitations in the boundary friction region.

There continues to be a need to create lubricant compositions that provide reduced friction while maintaining lower costs.

BRIEF SUMMARY

The various embodiments of the disclosure relate generally to random copolymers of acrylates and lubricants containing the same.

An embodiment of the disclosure can be a random copolymer obtained from polymerizing an acrylate monomer composition. The monomer composition can have a) from about 1 to about 60 mole % of at least one short chain acrylate of Formula (I)

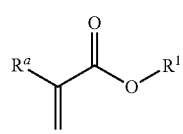

(I)

in which $R^a$ can be hydrogen or methyl, and $R^1$ can be a linear or branched $C_1$ to $C_{10}$ alkyl radical;

b) from about 0 to about 94 mole % of at least one long chain acrylate of Formula (II),

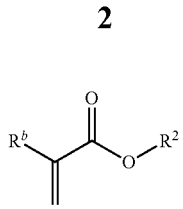

(II)

in which $R^b$ can be hydrogen or methyl, and $R^2$ can be a linear or branched $C_{11}$ to $C_{15}$ alkyl radical;

c) from about 0 to about 94% of at least one long chain acrylate of formula (III)

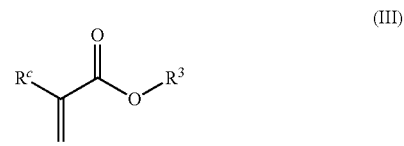

(III)

in which $R^c$ can be hydrogen or methyl, and $R^3$ can be a linear or branched $C_{16}$ to $C_{30}$ alkyl radical; and d) from about 5 to about 50 mole % of at least one polar acrylate of formula (IV),

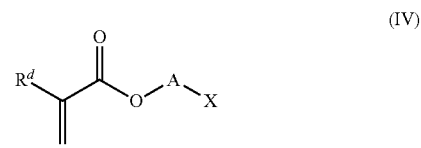

(IV)

in which $R^d$ can be hydrogen or methyl, A can be a linear or branched $C_2$ to $C_6$ alkyl radical, aromatic radical, or a polyether of the formula $(-CHR^4CH_2-O-)_n$ where $R^4$ can be hydrogen or methyl and n can be from 1 to 10; and X can be COOH, OH, or $NR^{21}R^{22}$. The long chain acrylates of component b) and component c) together can total from about 35 mol % to about 94 mole % of the acrylate monomers. The ratio of short chain acrylate to long chain acrylate can be from about 0.05 to about 2. The copolymer can have an $M_n$ of about 1000 to about 15,000 g/mol.

In some embodiments, at least one of $R^a$, $R^b$, $R^c$, and $R^d$ can be methyl. In some embodiments, each of $R^a$, $R^b$, $R^c$, and $R^d$ is methyl. In alternate embodiments, each of $R^a$, $R^b$, $R^c$, and $R^d$ is hydrogen.

In some embodiments, $R^1$ can be methyl. $R^2$ can be a linear or branched $C_{12}$ to $C_{14}$ alkyl radical, and $R^3$ can be a linear or branched $C_{16}$ to $C_{24}$ alkyl radical. The random copolymer can include an A that can be a $C_2$ to $C_4$ alkyl radical or a polyether of n=1 to 4. In some embodiments, A can be $-CH_2CH_2-$.

The copolymer can contain at least about 1 mole % short chain acrylate, and the copolymer can have a of short chain acrylate to long chain acrylate of greater than 0 to about 2. The ratio of short chain acrylate to long chain acrylate can also be about 0.3 to about 1.5. The random copolymer can have from about 5 to about 20 mole % of the short chain acrylate. The random copolymer can have from about 30 to about 90 mole % of the long chain acrylates, or about 30 to about 75 mole %. The random copolymer can have from about 10 to about 45 mole % of the polar chain acrylate.

The random copolymer can have an $M_n$ of about 1000 to about 10000, or about 2000 to about 10000, or about 2000 to about 8000.

The random copolymer can include from about 5 to about 45 mole % methyl acrylate; from about 30 to about 70 mol % lauryl-myristyl acrylate; and from about 10 to about 45 mole % 2-hydroxyethyl acrylate, and can have an $M_n$ of about 2000 to about 10,000 and a ratio of short chain acrylate to long chain acrylate of about 0.1 to about 1.5.

An embodiment of the disclosure can include a lubricating oil composition. The lubricating oil composition can include a base oil and at least one additive having friction-modifying properties, where the additive can be a random copolymer obtained from polymerizing an acrylate monomer composition, as disclosed in the paragraphs above.

The following definitions of terms are provided in order to clarify the meanings of certain terms as used herein.

The terms "oil composition," "lubrication composition," "lubricating oil composition," "lubricating oil," "lubricant composition," "lubricating composition," "fully formulated lubricant composition," "lubricant," "crankcase oil," "crankcase lubricant," "engine oil," "engine lubricant," "motor oil," and "motor lubricant" are considered synonymous, fully interchangeable terminology referring to the finished lubrication product comprising a major amount of a base oil plus a minor amount of an additive composition.

As used herein, the terms "additive package," "additive concentrate," "additive composition," "engine oil additive package," "engine oil additive concentrate," "crankcase additive package," "crankcase additive concentrate," "motor oil additive package," "motor oil concentrate," are considered synonymous, fully interchangeable terminology referring the portion of the lubricating oil composition excluding the major amount of base oil stock mixture. The additive package may or may not include the viscosity index improver or pour point depressant.

The term "overbased" relates to metal salts, such as metal salts of sulfonates, carboxylates, salicylates, and/or phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids, carboxylic acids, salicylates, and/or phenols.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(a) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic moiety);

(b) substituted hydrocarbon substituents, that is, substituents containing non-hydrocarbon groups which, in the context of this disclosure, do not alter the predominantly hydrocarbon substituent (e.g., halo (especially chloro and fluoro), hydroxy, alkoxy, mercapto, alkylmercapto, nitro, nitroso, amino, alkylamino, and sulfoxy); and (c) hetero substituents, that is, substituents which, while having a predominantly hydrocarbon character, in the context of this disclosure, contain other than carbon in a ring or chain otherwise composed of carbon atoms. Heteroatoms may include sulfur, oxygen, and nitrogen, and encompass substituents such as pyridyl, furyl, thienyl, and imidazolyl. In general, no more than two, for example, no more than one, non-hydrocarbon substituent will be present for every ten carbon atoms in the hydrocarbyl group; typically, there will be no non-hydrocarbon substituents in the hydrocarbyl group.

As used herein, the term "percent by weight", unless expressly stated otherwise, means the percentage the recited component represents to the weight of the entire composition.

The terms "soluble," "oil-soluble," or "dispersible" used herein may, but does not necessarily, indicate that the compounds or additives are soluble, dissolvable, miscible, or capable of being suspended in the oil in all proportions. The foregoing terms do mean, however, that they are, for instance, soluble, suspendable, dissolvable, or stably dispersible in oil to an extent sufficient to exert their intended effect in the environment in which the oil is employed. Moreover, the additional incorporation of other additives may also permit incorporation of higher levels of a particular additive, if desired.

The term "TBN" as employed herein is used to denote the Total Base Number in mg KOH/g as measured by the method of ASTM D2896 or ASTM D4739 or DIN 51639-1.

The term "alkyl" as employed herein refers to straight, branched, cyclic, and/or substituted saturated chain moieties of from about 1 to about 100 carbon atoms.

The term "alkenyl" as employed herein refers to straight, branched, cyclic, and/or substituted unsaturated chain moieties of from about 3 to about 10 carbon atoms.

The term "aryl" as employed herein refers to single and multi-ring aromatic compounds that may include alkyl, alkenyl, alkylaryl, amino, hydroxyl, alkoxy, halo substituents, and/or heteroatoms including, but not limited to, nitrogen, oxygen, and sulfur.

Lubricants, combinations of components, or individual components of the present description may be suitable for use in various types of internal combustion engines. Suitable engine types may include, but are not limited to heavy duty diesel, passenger car, light duty diesel, medium speed diesel, or marine engines. An internal combustion engine may be a diesel fueled engine, a gasoline fueled engine, a natural gas fueled engine, a bio-fueled engine, a mixed diesel/biofuel fueled engine, a mixed gasoline/biofuel fueled engine, an alcohol fueled engine, a mixed gasoline/alcohol fueled engine, a compressed natural gas (CNG) fueled engine, or mixtures thereof. A diesel engine may be a compression ignited engine. A gasoline engine may be a spark-ignited engine. An internal combustion engine may also be used in combination with an electrical or battery source of power. An engine so configured is commonly known as a hybrid engine. The internal combustion engine may be a 2-stroke, 4-stroke, or rotary engine. Suitable internal combustion engines include marine diesel engines (such as inland marine), aviation piston engines, low-load diesel engines, and motorcycle, automobile, locomotive, and truck engines.

The internal combustion engine may contain components of one or more of an aluminum-alloy, lead, tin, copper, cast iron, magnesium, ceramics, stainless steel, composites, and/ or mixtures thereof. The components may be coated, for example, with a diamond-like carbon coating, a lubrited coating, a phosphorus-containing coating, molybdenum-containing coating, a graphite coating, a nano-particle-containing coating, and/or mixtures thereof. The aluminum-alloy may include aluminum silicates, aluminum oxides, or other ceramic materials. In one embodiment the aluminum-alloy is an aluminum-silicate surface. As used herein, the term "aluminum alloy" is intended to be synonymous with "aluminum composite" and to describe a component or surface comprising aluminum and another component intermixed or reacted on a microscopic or nearly microscopic level, regardless of the detailed structure thereof. This would include any conventional alloys with metals other than aluminum as well as composite or alloy-like structures with non-metallic elements or compounds such with ceramic-like materials.

The lubricating oil composition for an internal combustion engine may be suitable for any engine lubricant irrespective of the sulfur, phosphorus, or sulfated ash (ASTM D-874) content. The sulfur content of the engine oil lubricant may be about 1 wt % or less, or about 0.8 wt % or less, or about 0.5 wt % or less, or about 0.3 wt % or less, or about 0.2 wt % or less. In one embodiment the sulfur content may be in the range of about 0.001 wt % to about 0.5 wt %, or about 0.01 wt % to about 0.3 wt %. The phosphorus content may be about 0.2 wt % or less, or about 0.1 wt % or less, or about 0.085 wt % or less, or about 0.08 wt % or less, or even about 0.06 wt % or less, about 0.055 wt % or less, or about 0.05 wt % or less. In one embodiment the phosphorus content may be about 50 ppm to about 1000 ppm, or about 325 ppm to about 850 ppm. The total sulfated ash content may be about 2 wt % or less, or about 1.5 wt % or less, or about 1.1 wt % or less, or about 1 wt % or less, or about 0.8 wt % or less, or about 0.5 wt % or less. In one embodiment the sulfated ash content may be about 0.05 wt % to about 0.9 wt %, or about 0.1 wt % or about 0.2 wt % to about 0.45 wt %. In another embodiment, the sulfur content may be about 0.4 wt % or less, the phosphorus content may be about 0.08 wt % or less, and the sulfated ash is about 1 wt % or less. In yet another embodiment the sulfur content may be about 0.3 wt % or less, the phosphorus content is about 0.05 wt % or less, and the sulfated ash may be about 0.8 wt % or less.

In one embodiment the lubricating oil composition is an engine oil, wherein the lubricating oil composition may have (i) a sulfur content of about 0.5 wt % or less, (ii) a phosphorus content of about 0.1 wt % or less, and (iii) a sulfated ash content of about 1.5 wt % or less.

In one embodiment the lubricating oil composition is suitable for a 2-stroke or a 4-stroke marine diesel internal combustion engine. In one embodiment the marine diesel combustion engine is a 2-stroke engine. In some embodiments, the lubricating oil composition is not suitable for a 2-stroke or a 4-stroke marine diesel internal combustion engine for one or more reasons, including but not limited to, the high sulfur content of fuel used in powering a marine engine and the high TBN required for a marine-suitable engine oil (e.g., above about 40 TBN in a marine-suitable engine oil).

In some embodiments, the lubricating oil composition is suitable for use with engines powered by low sulfur fuels, such as fuels containing about 1 to about 5% sulfur. Highway vehicle fuels contain about 15 ppm sulfur (or about 0.0015% sulfur).

Low speed diesel typically refers to marine engines, medium speed diesel typically refers to locomotives, and high speed diesel typically refers to highway vehicles. The lubricating oil composition may be suitable for only one of these types or all.

Further, lubricants of the present description may be suitable to meet one or more industry specification requirements such as ILSAC GF-3, GF-4, GF-5, GF-6, PC-11, CI-4, CJ-4, ACEA A1/B1, A2/B2, A3/B3, A3/B4, A5/B5, C1, C2, C3, C4, C5, E4/E6/E7/E9, Euro 5/6, Jaso DL-1, Low SAPS, Mid SAPS, or original equipment manufacturer specifications such as Dexos™ 1, Dexos™ 2, MB-Approval 229.51/229.31, VW 502.00, 503.00/503.01, 504.00, 505.00, 506.00/506.01, 507.00, 508.00, 509.00, BMW Longlife-04, Porsche C30, Peugeot Citroën Automobiles B71 2290, B71 2296, B71 2297, B71 2300, B71 2302, B71 2312, B71 2007, B71 2008, Ford WSS-M2C153-H, WSS-M2C930-A, WSS-M2C945-A, WSS-M2C913A, WSS-M2C913-B, WSS-M2C913-C, GM 6094-M, Chrysler MS-6395, or any past or future PCMO or HDD specifications not mentioned herein. In some embodiments for passenger car motor oil (PCMO) applications, the amount of phosphorus in the finished fluid is 1000 ppm or less or 900 ppm or less or 800 ppm or less.

Other hardware may not be suitable for use with the disclosed lubricant. A "functional fluid" is a term which encompasses a variety of fluids including but not limited to tractor hydraulic fluids, power transmission fluids including automatic transmission fluids, continuously variable transmission fluids and manual transmission fluids, hydraulic fluids, including tractor hydraulic fluids, some gear oils, power steering fluids, fluids used in wind turbines, compressors, some industrial fluids, and fluids related to power train components. It should be noted that within each of these fluids such as, for example, automatic transmission fluids, there are a variety of different types of fluids due to the various transmissions having different designs which have led to the need for fluids of markedly different functional characteristics. This is contrasted by the term "lubricating fluid" which is not used to generate or transfer power.

With respect to tractor hydraulic fluids, for example, these fluids are all-purpose products used for all lubricant applications in a tractor except for lubricating the engine. These lubricating applications may include lubrication of gearboxes, power take-off and clutch(es), rear axles, reduction gears, wet brakes, and hydraulic accessories.

When the functional fluid is an automatic transmission fluid, the automatic transmission fluids must have enough friction for the clutch plates to transfer power. However, the friction coefficient of fluids has a tendency to decline due to the temperature effects as the fluid heats up during operation. It is important that the tractor hydraulic fluid or automatic transmission fluid maintain its high friction coefficient at elevated temperatures, otherwise brake systems or automatic transmissions may fail. This is not a function of an engine oil.

Tractor fluids, and for example Super Tractor Universal Oils (STUOs) or Universal Tractor Transmission Oils (UTTOs), may combine the performance of engine oils with transmissions, differentials, final-drive planetary gears, wet-brakes, and hydraulic performance. While many of the additives used to formulate a UTTO or a STUO fluid are similar in functionality, they may have deleterious effect if not incorporated properly. For example, some anti-wear and extreme pressure additives used in engine oils can be extremely corrosive to the copper components in hydraulic pumps. Detergents and dispersants used for gasoline or diesel engine performance may be detrimental to wet brake performance. Friction modifiers specific to quiet wet brake noise, may lack the thermal stability required for engine oil performance. Each of these fluids, whether functional, tractor, or lubricating, are designed to meet specific and stringent manufacturer requirements.

The present disclosure provides novel lubricating oil blends formulated for use as automotive crankcase lubricants. The present disclosure provides novel lubricating oil blends formulated for use as 2T and/or 4T motorcycle crankcase lubricants. Embodiments of the present disclosure may provide lubricating oils suitable for crankcase applications and having improvements in the following characteristics: air entrainment, alcohol fuel compatibility, antioxidancy, antiwear performance, biofuel compatibility, foam reducing properties, friction reduction, fuel economy, pre-ignition prevention, rust inhibition, sludge and/or soot dispersability, piston cleanliness, deposit formation, and water tolerance.

Engine oils of the present disclosure may be formulated by the addition of one or more additives, as described in detail below, to an appropriate base oil formulation. The additives may be combined with a base oil in the form of an additive package (or concentrate) or, alternatively, may be combined individually with a base oil (or a mixture of both). The fully formulated engine oil may exhibit improved performance properties, based on the additives added and their respective proportions.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Figure 1:
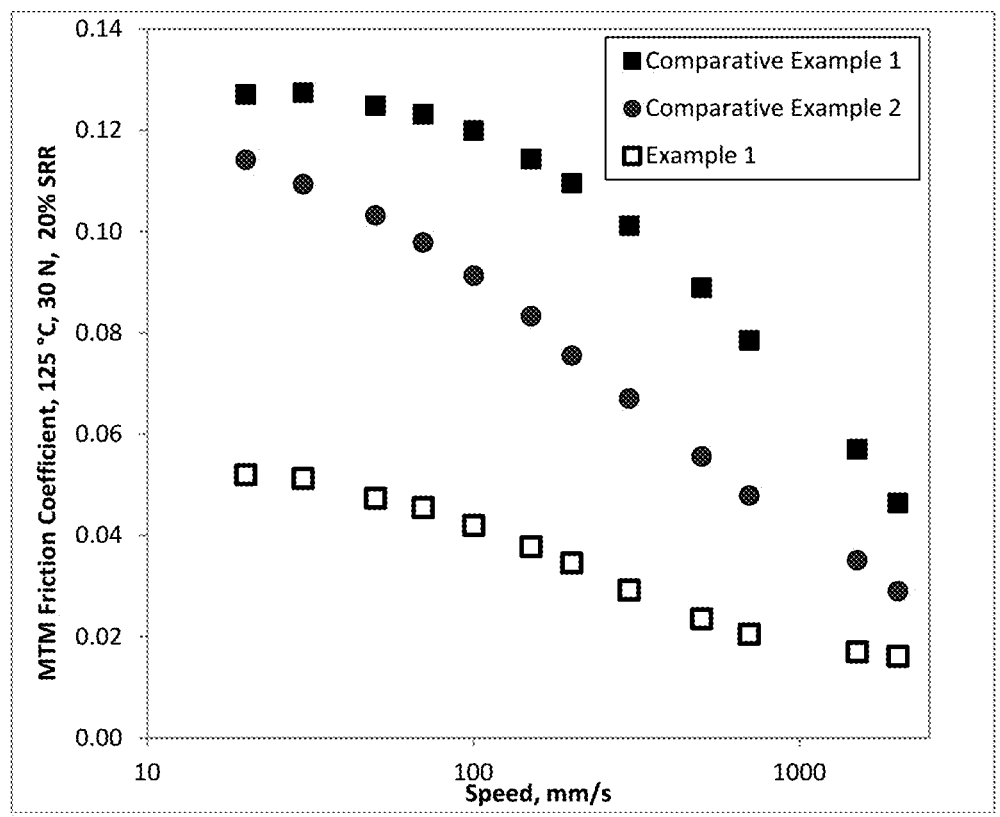
FIG. 1 illustrates a graph of friction coefficient versus speed for comparative polymers and a random copolymer, in accordance with an exemplary embodiment of the disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "comprising" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Compositions of random copolymers are disclosed. The random copolymers can contain two or more different acrylates, where the two or more different acrylate monomers can be copolymerized to form the random copolymer. By virtue of being polymerized from acrylate monomers, the random copolymer can be described as a polyacrylate. The random copolymers disclosed herein demonstrate very high friction reduction, and can thus be described as polymeric friction modifiers. The random copolymers or polymeric friction modifiers are suitable to reducing friction in an engine, and can be part of a lubricating oil compositions. The polyacrylates suitable for these applications are further described below.

The random copolymer can be obtained from polymerizing an acrylate monomer composition, where the acrylate monomer composition can contain:

a) from greater than 0 to about 60 mole % of at least one short chain acrylate of formula (I)

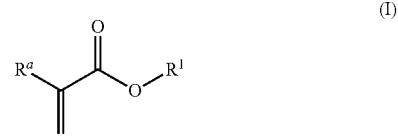

(I)

in which $R^a$ can be hydrogen or methyl, and $R^1$ can be a linear or branched $C_1$ to $C_{10}$ alkyl radical;

b) from about 0 to about 94 mole % of at least one long chain acrylate of formula (II),

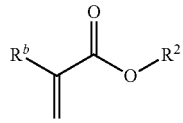

in which $R^b$ can be hydrogen or methyl, and $R^2$ can be a linear or branched $C_{11}$ to $C_{15}$ alkyl radical;

c) from about 0 to about 94% of at least one long chain acrylate of formula (III)

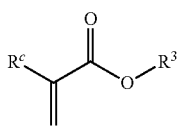

in which $R^c$ can be hydrogen or methyl, and $R^3$ can be a linear or branched $C_{16}$ to $C_{30}$ alkyl radical; and d) from about 5 to about 60 mole % of at least one polar acrylate of formula (IV),

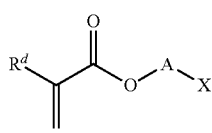

in which $R^d$ can be hydrogen or methyl, the terminal —OH can be a hydroxyl group, and A can be $(CH_2)_m$, a linear or branched $C_2$ to $C_6$ alkyl radical, aromatic radical, a polyether of the formula $(-CHR^4CH_2-O-)_n$, or combinations thereof, where m can be 2-10, $R^4$ can be hydrogen or methyl, and n can be from 1 to 10; and X can be COOH, OH, or $NR^{21}R^{22}$. In the composition, the long chain acrylates of component b) and component c) together can total from about 35 mol % to 94 mole % of the acrylate monomers.

The disclosure includes compositions of polyacrylates, which can be obtained by polymerizing an acrylate monomer composition. The acrylate monomer composition can include the components listed above, and can be described based on the amounts and types of monomers that are used to prepare the polymer. The polymer described herein can be then characterized by the type and amounts of those monomers described as a mole % of the total monomer composition.

The composition can include one or more short chain acrylate compounds. The short chain acrylate compound can be Formula (I)

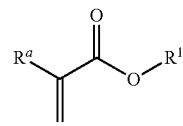

in which $R^a$ can be hydrogen or methyl. By short chain acrylate is meant that the ester of the acrylate designated $R^1$ can be linear or branched alkyl radical of one to ten carbons, i.e. $C_1$ to $C_{10}$. In an embodiment, $R^1$ can be $C_1$ to $C_8$, $C_1$ to $C_6$, or $C_1$ to $C_4$. In an embodiment, $R^1$ can be methyl or ethyl, or $R^1$ can be methyl. Nonlimiting examples of the short chain acrylate can include methyl acrylate, ethyl acrylate, propyl acrylate, butyl acrylate, pentyl acrylate, hexyl acrylate, heptyl acrylate, octyl acrylate, nonyl acrylate, and decyl acrylate. The short chain acrylates can include linear or branched chains, such as n-propyl, isopropyl, n-butyl, sec-butyl, isobutyl, tert butyl, and so forth as one of ordinary skill would recognize. The short chain acrylate can also include a mixture of one or more of any of the above, such as, for example, a mixture of methyl acrylate and ethyl acrylate, or butyl acrylate, pentyl acrylate, and hexyl acrylate, etc.

In some embodiments, the short chain acrylate can be from greater than 0 to about 60 mole % of the composition. The short chain acrylate can be greater than 0 mole % of the composition, including at least about 0.1 mole %, at least about 0.2 mole %, at least about 0.5 mole %, or at least about 1.0 mole %. The short chain acrylate can be less than about 60 mole %, can be less than about 55 mole %, can be less than about 50 mole %, or can be less than about 45 mole % of the composition. The short chain acrylate can be from about 1 to about 60 mole %, from about 1 to about 55 mole %, from about 1 to about 50 mole %, from about 5 to about 60 mole %, from about 10 to about 60 mole %, from about 5 to about 55 mole %, from about 10 to about 55 mole %, from about 5 to about 50 mole %, from about 10 to about 50 mole %, from about 1 to about 45 mole %, from about 5 to about 45 mole %, from about 1 to about 40 mole %, from about 5 to about 40 mole %, or from about 10 to about 40 mole % of the composition.

The composition can include one or more long chain acrylate compounds. The long chain acrylate component can be Formula (II),

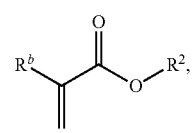

or Formula (III)

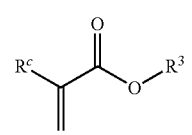

in which $R^b$ and $R^c$ can each independently be hydrogen or methyl. The composition can also include long chain acrylates of both Formulas (II) and (III). By long chain acrylates is meant that the ester of the acrylate can be a linear or branched carbon chain of at least eleven carbons.

In Formula (II), the long chain acrylate can include an $R^2$ which can be a linear or branched alkyl radical of between about 11 and about 15 carbons, i.e. $C_{11}$ to $C_{15}$, including $C_{12}$ to $C_{15}$, $C_{13}$ to $C_{15}$, $C_{11}$ to $C_{14}$, $C_{12}$ to $C_{14}$, $C_{12}$ to $C_{13}$, $C_{11}$ to $C_{13}$, and $C_{11}$ to $C_{12}$. Nonlimiting examples of $R^2$ can include lauryl, myristyl, and lauryl-myristyl mixtures. The long chain acrylate of Formula (II) can be from about 0 to about 94 mole % of the composition, including greater than 0 mole %, at least about 5 mole %, at least about 10 mole %, at least about 20 mole %, or at least about 30 mole %; and less than about 94 mole %, less than about 85 mole %, less than about 75 mole %, less than about 70 mole %, less than about 60 mole % and less than about 50 mole %.

In Formula (III), the long chain acrylate can include an $R^3$ which can be a linear or branched alkyl radical of between about 16 to about 50 carbons, preferably between about 16 to about 30 carbons, including $C_{16}$ to $C_{30}$, $C_{16}$ to $C_{24}$, and $C_{16}$ to $C_{20}$. Nonlimiting examples of $R^3$ can include cetyl, stearyl, cosyl, eicosyl, hexadecyl, octadecyl, cetyl-stearyl, and cetyl-eicosyl, and mixtures thereof. The long chain acrylate of Formula (III) can be from about 0 to about 94 mole % of the composition, including greater than 0 mole %, at least about 5 mole %, at least about 10 mole %, at least about 20 mole %, or at least about 30 mole %; and less than about 94 mole %, less than about 85 mole %, less than about 75 mole %, less than about 70 mole %, less than about 60 mole % and less than about 50 mole %.

One aspect of the disclosure can be that the long chain acrylates of the composition, including acrylates of Formula (II) and Formula (III), make up about 25 to 94 mole % of the total monomer composition. The long chain acrylates can be at least about 25 mole %, at least about 30 mole %, at least about 35 mole %, at least about 40 mole %, at least about 45 mole %, or at least about 50 mole % of the monomer composition. The long chain acrylates can be less than about 94 mole %, less than about 90 mole %, less than about 85 mole %, less than about 80 mole %, less than about 75 mole %, or less than about 70 mole % of the monomer composition. The long chain acrylate can be from about 30 to about 94 mole % of the composition, from about 35 to about 94 mole % of the composition, from about 25 to about 90 mole % of the composition, from about 30 to about 90 mole % of the composition, from about 35 to about 90 mole % of the composition, from about 25 to about 85 mole % of the composition, from about 30 to about 85 mole % of the composition, or from about 35 to about 85 mole % of the composition, from about 25 to about 80 mole % of the composition, from about 30 to about 80 mole % of the composition, or from about 35 to about 80 mole % of the composition, or from about 25 to about 75 mole % of the composition, from about 30 to about 75 mole % of the composition, from about 30 to about 70 mole % of the composition, or from about 35 to about 75 mole % of the composition.

The composition can include one or more polar acrylates. The polar acrylate can be Formula (IV)

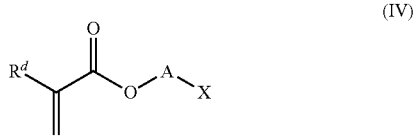

(IV)

in which $R^d$ can be hydrogen or methyl. By polar acrylate is meant that the ester of the acrylate contains a terminal polar group such as an acid, amine, or alcohol. The polar acrylate can include an A that can be $(CH_2)_m$, a linear or branched $C_2$ to $C_6$ alkyl radical, aromatic radical, a polyether of the formula $(-CHR^4CH_2-O-)_n$ or combinations thereof. A can be can be $(CH_2)_m$, where m can be 2-10, i.e. a series of methylene radical that would include, for example, $-CH_2CH_2-$ (ethylene), $-CH_2CH_2CH_2-$ (propylene), and $-CH_2CH_2CH_2CH_2-$(butylenes). A can be a linear or branched $C_2$ to $C_6$ radical, or a linear or branched $C_2$ to $C_4$ radical. A can be an aromatic radical, such as for example $-C_6H_4-$ (phenyl). A can be a short polyether of the formula $(-CHR^4CH_2-O-)_n$, where $R^4$ can be a hydrogen (i.e. a ethylene glycol group) or a methyl group (i.e. a propylene glycol group), and n can be from 1 to 10. The polar acrylate can include an X that is a polar end group. X can be COOH, OH, or $NR^{21}R^{22}$, where $R^a$ and $R^b$ are each individually hydrogen or a $C_1$ to $C_4$ alkyl group. In an embodiment, X can be OH or COOH, or X can be OH. One exemplary embodiment of the polar acrylate can be hydroxyethylacrylate.

In some embodiments of the disclosure, the polar acrylate can be about 5 mole % to about 60 mole % of the composition. The polar acrylate can be at least about 5 mole %, at least about 6 mole %, at least about 7 mole %, at least about 8 mole %, or at least about 9 mole % of the composition. The polar acrylate can be at least about 10 mole %, at least about 15 mole %, or at least about 20 mole % of the composition. The polar acrylate group can be less than about 60 mole %, less than about 55 mole %, less than about 50 mole %, less than about 45 mole %, less than about 40 mole %, or less than about 35 mole % of the composition. The polar acrylate can be from about 5 to about 55 mole % of the composition, from about 5 to about 50 mole % of the composition, from about 5 to about 45 mole % of the composition, or from about 5 to about 40 mole % of the composition. The polar acrylate can be from about 10 to about 60 mole % of the composition, from about 10 to about 50 mole % of the composition, from about 10 to about 45 mole % of the composition, or from about 10 to about 40 mole % of the composition. The polar acrylate can be from about 15 to about 60 mole % of the composition, from about 15 to about 50 mole % of the composition, from about 15 to about 45 mole % of the composition, from about 15 to about 40 mole % of the composition, or from about 15 to about 35 mole % of the composition.

An aspect of the disclosure is the use of acrylates, including methacrylates, in the polymer composition. In some embodiments of the disclosure, $R^a$, $R^b$, $R^c$, and $R^d$ of Formulas I, II, III, and IV respectively, can each be hydrogen. In some embodiments, at least one of $R^a$, $R^b$, $R^c$, and $R^d$ can be methyl. In some embodiment, $R^a$, $R^b$, $R^c$, and $R^d$ can each be methyl. Preferably, at least one of $R^a$, $R^b$, $R^c$, and $R^d$ is methyl.

One aspect of the disclosure includes the combination of several types of acrylates to produce the composition. In one embodiment, the composition can have a ratio of short chain acrylates to long chain acrylates, where the long chain acrylates is the combination of acrylates in Formulas (II) and (III) above. The ratio is expressed as the molar ratio. The short chain to long chain ratio can be from about 0 to about 2, or from greater than about 0 to about 2. The short chain to long chain ratio can be about 0.05 or more, about 0.1 or more, about 0.15 or more, about 0.2 or more, about 0.3 or more, or about 0.5 or more. The short chain to long chain ratio can be about 2 or less, about 1.8 or less, about 1.6 or less, or about 1.5 or less. The short chain to long chain ratio can be from about 0.1 to about 2, from about 0.3 to about 2, from about 0.1 to about 1.5, from about 0.3 to about 1.5, or from about 0.5 to about 1.5.

The polymer composition can have a number average molecular weight, $M_n$ of about 1,000 to 15,000. The number average molecular weight can be at least about 1,000, 2,000, 3,000, or 4,000. The number average molecular weight can be about 15,000 or less, about 12,000 or less, about 10,000 or less, or about 8,000 or less. The number average molecular weight can be from about 1,000 to about 15,000, from about 1,000 to about 12,000, from about 1,000 to about 10,000, or from about 1,000 to about 8,000. The number average molecular weight can be from about 2,000 to about 15,000, from about 2,000 to about 12,000, from about 2,000 to about 10,000, or from about 2,000 to about 8,000. The number average molecular weight can be from about 3,000 to about 15,000, from about 3,000 to about 12,000, from about 3,000 to about 10,000, or from about 3,000 to about 8,000.

The polymer compositions of this disclosure can have a polydispersity $M_w/M_n$ of between about 1.05 to about 3.0, between about 1.1 to about 2.5, or between about 1.2 to about 2.0. Polydispersity, $M_n$, and $M_w$ can be measure by any known method, typically by GPC.

In some exemplary embodiments, the polymer composition can include greater than 0-60 mole % of a short chain acrylate with $R^1$ being $C_1$ to $C_4$, about 30 to about 90 mole % of a long chain acrylate of Formula (II) with $R^2$ being $C_{12}$ to $C_{14}$, and about 10 to about 50 mole % of a polar acrylate with A being a $C_2$ to $C_4$ alkyl. The polymer composition can include 1-45 mole % of a short chain acrylate with $R^1$ being $C_1$ to $C_4$, about 30 to about 90 mole % of a long chain acrylate of Formula (II) with $R^2$ being $C_{12}$ to $C_{14}$, and about 10 to about 40 mole % of a polar acrylate with A being a $C_2$ to $C_4$ alkyl. The polymer composition can include 5-45 mole % of a short chain acrylate with $R^1$ being $C_1$ to $C_4$, about 30 to about 70 mole % of a long chain acrylate of Formula (II) with $R^2$ being $C_{12}$ to $C_{14}$, and about 10 to about 45 mole % of a polar acrylate with A being a $C_2$ to $C_4$ alkyl. The polymer composition can include 5-35 mole % of a short chain acrylate with $R^1$ being $C_1$ to $C_4$, about 40 to about 70 mole % of a long chain acrylate of Formula (II) with $R^2$ being $C_{12}$ to $C_{14}$, and about 10 to about 40 mole % of a polar acrylate with A being a $C_2$ to $C_4$ alkyl. In some instances of these exemplary embodiments, $R^1$ can be methyl. In some instances of these exemplary embodiments, X can be OH. In some instances of these exemplary embodiments, A can be —CH$_2$CH$_2$—. In some instances of these exemplary embodiments, the short chain acrylate of Formula (I) can be methyl acrylate, and the polar acrylate of Formula (IV) can be hydroxyethyl acrylate.

In some exemplary embodiments, the polymer composition can include 5-40 mole % polar acrylate, a short chain to long chain ratio of from about 0.1 to 2.0, and a $M_n$ of between 2000 and 10000. The polymer composition can include 10-40 mole % polar acrylate, a short chain to long chain ratio of from about 0.3 to 1.5, and a $M_n$ of between 2000 and 10000. The polymer composition can include 15-40 mole % polar acrylate, a short chain to long chain ratio of from about 0.3 to 1.0, and a $M_n$ of between 2000 and 8000.

The polymer composition of this disclosure can be prepared by any method known to one of ordinary skill in the polymerization of acrylate monomers. Typically, polymers can be prepared by free-radical polymerization. Typical free radical polymerizations including standard initiators can be used, but other similar techniques for achieving polyacrylates can also be applied. Because the copolymer is a random copolymer, as contrasted with block copolymers, the synthetic methods used to create the random copolymer can be cheaper and less complex.

Some exemplary initiators include the azo initiators, such as AIBN and 1,1-azobiscyclohexanecarbonitrile, or peroxy compounds such as methyl ethyl ketone peroxide, acetylacetone peroxide, dilauryl peroxide, tert-butyl per-2-ethylhexanoate (often also referred to as tert-butyl peroctoate tBPO), ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate.

The polymerization may be carried out in any known solvent for use in free-radical polymerization, or in the absence of solvent. Polymerizations can be typically carried out in non-polar hydrocarbon solvents, as well as in typical hydrocarbon oils, including synthetic oils, natural oils and mineral oils. Polymerizations can be carried out under typical known conditions, including a variety of temperatures and pressures.

Thus, the disclosure includes a process for preparing a random copolymer, comprising polymerizing an acrylate monomer composition in a random copolymer. The monomer composition to be polymerized can include a) from greater than 0 to 60 mole % of at least one short chain acrylate monomer of formula (I)

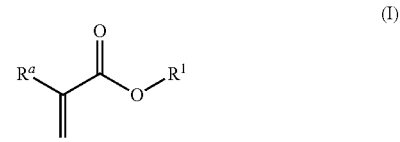

b) from 0 to 94 mole % of at least one long chain acrylate monomer of formula (II),

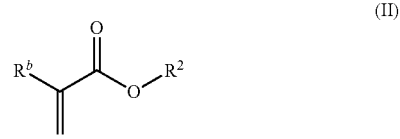

c) from 0 to 94% of at least one long chain acrylate monomer of formula (III)

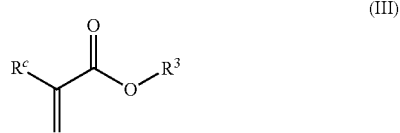

d) from 5 to 60 mole % of at least one polar acrylate monomer of formula (IV),

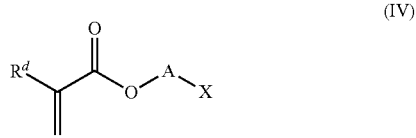

where $R^1$, $R^2$, $R^3$, $R^4$, $R^a$, $R^b$, $R^c$, $R^d$, m, n, A, and X are as defined above.

The disclosure can also include a random copolymer can be obtained from polymerizing an acrylate monomer composition, where the acrylate monomer composition can contain a) from greater than 0 to 60 mole % of at least one short chain acrylate of formula (V)

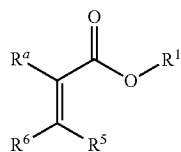
(V)

in which $R^a$ can be hydrogen or methyl, $R^1$ can be a linear or branched $C_1$ to $C_6$ alkyl radical, and $R^5$ and $R^6$ can be each independently H or —COOR$^{31}$, wherein $R^{31}$ can be a linear or branched $C_1$ to $C_6$ alkyl radical;

b) from 0 to 94 mole % of at least one long chain acrylate of Formula (VI),

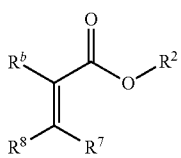
(VI)

in which $R^b$ can be hydrogen or methyl, $R^2$ can be a linear or branched $C_{11}$ to $C_{15}$ alkyl radical, and $R^7$ and $R^8$ can be each independently H or —COOR$^{32}$, wherein $R^{32}$ can be a linear or branched $C_{11}$ to $C_{15}$ alkyl radical;

c) from 0 to 94% of at least one long chain acrylate of Formula (VII)

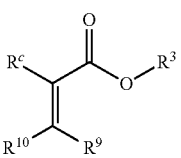
(VII)

in which $R^c$ can be hydrogen or methyl, $R^3$ can be a linear or branched $C_{16}$ to $C_{30}$ alkyl radical, and $R^9$ and $R^{10}$ can be each independently H or —COOR$^{33}$, wherein $R^{33}$ can be a linear or branched $C_{16}$ to $C_{30}$ alkyl radical; and d) from 5 to 60 mole % of at least one polar acrylate of Formula (VIII),

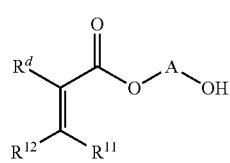
(VIII)

in which $R^d$ can be hydrogen or methyl, A can be a linear or branched $C_2$ to $C_6$ alkyl radical, aromatic radical, or a polyether of the formula (—CHR$^4$CH$_2$—O—)$_n$. $R^4$ can be hydrogen or methyl and n can be from 1 to 10. X can be COOH, OH, or NR$^{21}$R$^{22}$, and $R^{11}$ and $R^{12}$ can be each independently H or —COO-A-OH. The long chain acrylates of component b) and component c) together total from about 35 mol % to about 94 mole % of the monomer composition. The ratio of short chain acrylate to long chain acrylate can be 0 to about 2. The copolymer has an $M_n$ of 1000 to 15,000.

In Formulas (V), (VI), (VII), and (VIII), $R^1$, $R^2$, $R^3$, $R^4$, m, n, A, and X are as defined above with respect to Formulas (I), (II), (III), and (IV). Similarly, $R^{31}$ of Formula (V) has the equivalent description to $R^1$ as set forth above, $R^2$ of Formula (VI) has the equivalent description to $R^2$ as set forth above, and $R^{33}$ of Formula (VII) has the equivalent description to $R^3$ as set forth above.

In some embodiments, $R^a$, $R^b$, $R^c$, and $R^d$ can each be hydrogen. In some embodiments, at least one of $R^a$, $R^b$, $R^c$, and $R^d$ can be methyl. In some embodiment, $R^a$, $R^b$, $R^c$, and $R^d$ can each be methyl.

The long chain acrylate of Formula (VI) can be from about 0 to about 94 mole % of the composition, including greater than 0 mole %, at least about 5 mole %, at least about 10 mole %, at least about 20 mole %, or at least about 30 mole %; and less than about 94 mole %, less than about 85 mole %, less than about 75 mole %, less than about 70 mole %, less than about 60 mole % and less than about 50 mole %. The long chain acrylate of Formula (VII) can be from about 0 to about 94 mole % of the composition, including greater than 0 mole %, at least about 5 mole %, at least about 10 mole %, at least about 20 mole %, or at least about 30 mole %; and less than about 94 mole %, less than about 85 mole %, less than about 75 mole %, less than about 70 mole %, less than about 60 mole % and less than about 50 mole %.

One aspect of the disclosure can be that the long chain acrylates of the composition, including acrylates of Formula VI and Formula VII, make up about 25 to 94 mole % of the total monomer composition. The long chain acrylates can be at least about 25 mole %, at least about 30 mole %, at least about 35 mole %, at least about 40 mole %, at least about 45 mole %, or at least about 50 mole % of the monomer composition. The long chain acrylates can be less than about 95 mole %, less than about 90 mole %, less than about 85 mole %, less than about 80 mole %, less than about 75 mole %, or less than about 70 mole % of the monomer composition. The long chain acrylate can be from about 30 to about 94 mole % of the composition, from about 35 to about 94 mole % of the composition, from about 25 to about 90 mole % of the composition, from about 30 to about 90 mole % of the composition, from about 35 to about 90 mole % of the composition, from about 25 to about 85 mole % of the composition, from about 30 to about 85 mole % of the composition, or from about 35 to about 85 mole % of the composition, from about 25 to about 80 mole % of the composition, from about 30 to about 80 mole % of the composition, or from about 35 to about 80 mole % of the composition, or from about 25 to about 75 mole % of the composition, from about 30 to about 75 mole % of the composition, from about 30 to about 70 mole % of the composition, or from about 35 to about 75 mole % of the composition.

In some embodiments of the disclosure, the polar acrylate of Formula (VIII) can be about 5 mole % to about 60 mole % of the composition. The polar acrylate can be at least about 5 mole %, at least about 6 mole %, at least about 7 mole %, at least about 8 mole %, or at least about 9 mole % of the composition. The polar acrylate can be at least about 10 mole %, at least about 15 mole %, or at least about 20 mole % of the composition. The polar acrylate group can be less than about 60 mole %, less than about 55 mole %, less than about 50 mole %, less than about 45 mole %, less than about 40 mole %, or less than about 35 mole % of the composition. The polar acrylate can be from about 5 to about 55 mole % of the composition, from about 5 to about 50 mole % of the composition, from about 5 to about 45 mole % of the composition, or from about 5 to about 40 mole % of the composition. The polar acrylate can be from about 10 to about 60 mole % of the composition, from about 10 to about 50 mole % of the composition, from about 10 to about 45 mole % of the composition, or from about 10 to about 40 mole % of the composition. The polar acrylate can be from about 15 to about 60 mole % of the composition, from about 15 to about 50 mole % of the composition, from about 15 to about 45 mole % of the composition, from about 15 to about 40 mole % of the composition, or from about 15 to about 35 mole % of the composition.

One aspect of the disclosure includes the combination of several types of acrylates to produce the composition. In one embodiment, when the short chain acrylate of Formula (V) is greater than 0 mole % of the composition, the composition can have a ratio of short chain acrylates to long chain acrylates, where the long chain acrylates is the combination of acrylates in Formulas (VI) and (VII) above. The short chain to long chain ratio can be from about 0 to about 2, or from greater than about 0 to about 2. The short chain to long chain ratio can be about 0.05 or more, about 0.1 or more, about 0.15 or more, about 0.2 or more, about 0.3 or more, or about 0.5 or more. The short chain to long chain ratio can be about 2 or less, about 1.8 or less, about 1.6 or less, or about 1.5 or less. The short chain to long chain ratio can be from about 0.1 to about 2, from about 0.3 to about 2, from about 0.1 to about 1.5, from about 0.3 to about 1.5, or from about 0.5 to about 1.5.

The polymer composition composed of any of Formulas (V), (VI), (VII) and (VIII) can have a number average molecular weight, $M_n$, of about 1,000 to 15,000. The number average molecular weight can be at least about 1,000, 2,000, 3,000, or 4,000. The number average molecular weight can be about 15,000 or less, about 12,000 or less, about 10,000 or less, or about 8,000 or less. The number average molecular weight can be from about 1,000 to about 15,000, from about 1,000 to about 12,000, from about 1,000 to about 10,000, or from about 1,000 to about 8,000. The number average molecular weight can be from about 2,000 to about 15,000, from about 2,000 to about 12,000, from about 2,000 to about 10,000, or from about 2,000 to about 8,000. The number average molecular weight can be from about 3,000 to about 15,000, from about 3,000 to about 12,000, from about 3,000 to about 10,000, or from about 3,000 to about 8,000.

The disclosure also provides for a lubricating oil composition. The lubricating oil composition can include a base oil and at least one additive having friction-reducing properties. The at least one additive can be a random copolymer, or a polymeric friction modifier, obtained from polymerizing an acrylate monomer composition. The acrylates monomer components can include a) from 1 to 60 mole % of at least one short chain acrylate monomer of Formula (I)

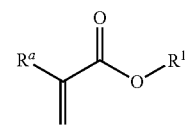

b) from 0 to 94 mole % of at least one long chain acrylate monomer of Formula (II),

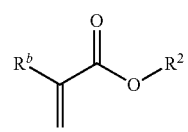

c) from 0 to 94% of at least one long chain acrylate monomer of Formula (III)

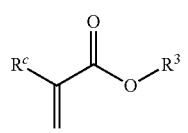

d) from 5 to 60 mole % of at least one polar acrylate monomer of Formula (IV),

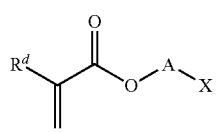

where $R^1$, $R^2$, $R^3$, $R^4$, $R^a$, $R^b$, $R^c$, $R^d$, m, n, A, and X are as defined above. Formula s (I) through (IV) may also be as described above.

Base Oil

The base oil used in the lubricating oil compositions herein may be selected from any of the base oils in Groups I-V as specified in the American Petroleum Institute (API) Base Oil Interchangeability Guidelines. The five base oil groups are as follows:

| Base oil Category | Sulfur (%) | | Saturates (%) | Viscosity Index |
|---|---|---|---|---|
| Group I | >0.03 | and/or | <90 | 80 to 120 |
| Group II | ≤0.03 | and | ≥90 | 80 to 120 |
| Group III | ≤0.03 | and | ≥90 | ≥120 |
| Group IV | All polyalphaolefins (PAOs) | | | |
| Group V | All others not included in Groups I, II, III, or IV | | | |

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that although Group III base oils are derived from mineral oil, the rigorous processing that these fluids undergo causes their physical properties to be very similar to some true synthetics, such as PAOs. Therefore, oils derived from Group III base oils may be referred to as synthetic fluids in the industry.

The base oil used in the disclosed lubricating oil composition may be a mineral oil, animal oil, vegetable oil, synthetic oil, or mixtures thereof. Suitable oils may be derived from hydrocracking, hydrogenation, hydrofinishing, unrefined, refined, and re-refined oils, and mixtures thereof.

Unrefined oils are those derived from a natural, mineral, or synthetic source without or with little further purification treatment. Refined oils are similar to the unrefined oils except that they have been treated in one or more purification steps, which may result in the improvement of one or more properties. Examples of suitable purification techniques are solvent extraction, secondary distillation, acid or base extraction, filtration, percolation, and the like. Oils refined to the quality of an edible may or may not be useful. Edible oils may also be called white oils. In some embodiments, lubricating oil compositions are free of edible or white oils.

Re-refined oils are also known as reclaimed or reprocessed oils. These oils are obtained similarly to refined oils using the same or similar processes. Often these oils are additionally processed by techniques directed to removal of spent additives and oil breakdown products.

Mineral oils may include oils obtained by drilling or from plants and animals or any mixtures thereof. For example such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as α-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof. Polyalphaolefins are typically hydrogenated materials.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

The major amount of base oil included in a lubricating composition may be selected from the group consisting of Group I, Group II, a Group III, a Group IV, a Group V, and a combination of two or more of the foregoing, and wherein the major amount of base oil is other than base oils that arise from provision of additive components or viscosity index improvers in the composition. In another embodiment, the major amount of base oil included in a lubricating composition may be selected from the group consisting of Group II, a Group III, a Group IV, a Group V, and a combination of two or more of the foregoing, and wherein the major amount of base oil is other than base oils that arise from provision of additive components or viscosity index improvers in the composition.

The amount of the oil of lubricating viscosity present may be the balance remaining after subtracting from 100 wt % the sum of the amount of the performance additives inclusive of viscosity index improver(s) and/or pour point depressant(s) and/or other top treat additives. For example, the oil of lubricating viscosity that may be present in a finished fluid may be a major amount, such as greater than about 50 wt %, greater than about 60 wt %, greater than about 70 wt %, greater than about 80 wt %, greater than about 85 wt %, or greater than about 90 wt %.

Antioxidants

The lubricating oil compositions herein also may optionally contain one or more antioxidants. Antioxidant compounds are known and include for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidant compounds may be used alone or in combination.

The hindered phenol antioxidant may contain a secondary butyl and/or a tertiary butyl group as a sterically hindering group. The phenol group may be further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant may be an ester and may include, e.g., Irganox™ L-135 available from BASF or an addition product derived from 2,6-di-tert-butylphenol and an alkyl acrylate, wherein the alkyl group may contain about 1 to about 18, or about 2 to about 12, or about 2 to about 8, or about 2 to about 6, or about 4 carbon atoms. Another commercially available hindered phenol antioxidant may be an ester and may include Ethanox™ 4716 available from Albemarle Corporation.

Useful antioxidants may include diarylamines and high molecular weight phenols. In an embodiment, the lubricating oil composition may contain a mixture of a diarylamine and a high molecular weight phenol, such that each antioxidant may be present in an amount sufficient to provide up to about 5%, by weight, based upon the final weight of the lubricating oil composition. In an embodiment, the antioxidant may be a mixture of about 0.3 to about 1.5% diarylamine and about 0.4 to about 2.5% high molecular weight phenol, by weight, based upon the final weight of the lubricating oil composition.

Examples of suitable olefins that may be sulfurized to form a sulfurized olefin include propylene, butylene, isobutylene, polyisobutylene, pentene, hexene, heptene, octene, nonene, decene, undecene, dodecene, tridecene, tetradecene, pentadecene, hexadecene, heptadecene, octadecene, nonadecene, eicosene or mixtures thereof. In one embodiment, hexadecene, heptadecene, octadecene, nonadecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes sulfurized fatty acids and their esters. The fatty acids are often obtained from vegetable oil or animal oil and typically contain about 4 to about 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. Fatty acids and/or ester may be mixed with olefins, such as α-olefins.

The one or more antioxidant(s) may be present in ranges about 0 wt % to about 20 wt %, or about 0.1 wt % to about 10 wt %, or about 1 wt % to about 5 wt %, of the lubricating oil composition.

Antiwear Agents

The lubricating oil compositions herein also may optionally contain one or more antiwear agents. Examples of suitable antiwear agents include, but are not limited to, a metal thiophosphate; a metal dialkyldithiophosphate; a phosphoric acid ester or salt thereof; a phosphate ester(s); a phosphite; a phosphorus-containing carboxylic ester, ether, or amide; a sulfurized olefin; thiocarbamate-containing compounds including, thiocarbamate esters, alkylene-coupled thiocarbamates, and bis(S-alkyldithiocarbamyl)disulfides; and mixtures thereof. A suitable antiwear agent may be a molybdenum dithiocarbamate. The phosphorus containing antiwear agents are more fully described in European Patent 612 839. The metal in the dialkyl dithio phosphate salts may be an alkali metal, alkaline earth metal, aluminum, lead, tin, molybdenum, manganese, nickel, copper, titanium, or zinc. A useful antiwear agent may be zinc dialkyldithiophosphate.

Further examples of suitable antiwear agents include titanium compounds, tartrates, tartrimides, oil soluble amine salts of phosphorus compounds, sulfurized olefins, phosphites (such as dibutyl phosphite), phosphonates, thiocarbamate-containing compounds, such as thiocarbamate esters, thiocarbamate amides, thiocarbamic ethers, alkylene-coupled thiocarbamates, and bis(S-alkyldithiocarbamyl) disulfides. The tartrate or tartrimide may contain alkyl-ester groups, where the sum of carbon atoms on the alkyl groups may be at least 8. The antiwear agent may in one embodiment include a citrate.

The antiwear agent may be present in ranges including about 0 wt % to about 15 wt %, or about 0.01 wt % to about 10 wt %, or about 0.05 wt % to about 5 wt %, or about 0.1 wt % to about 3 wt % of the lubricating oil composition.

Boron-Containing Compounds

The lubricating oil compositions herein may optionally contain one or more boron-containing compounds.

Examples of boron-containing compounds include borate esters, borated fatty amines, borated epoxides, borated detergents, and borated dispersants, such as borated succinimide dispersants, as disclosed in U.S. Pat. No. 5,883,057.

The boron-containing compound, if present, can be used in an amount sufficient to provide up to about 8 wt %, about 0.01 wt % to about 7 wt %, about 0.05 wt % to about 5 wt %, or about 0.1 wt % to about 3 wt % of the lubricating oil composition.

Detergents

The lubricating oil composition may optionally further comprise one or more neutral, low based, or overbased detergents, and mixtures thereof. Suitable detergent substrates include phenates, sulfur containing phenates, sulfonates, calixarates, salixarates, salicylates, carboxylic acids, phosphorus acids, mono- and/or di-thiophosphoric acids, alkyl phenols, sulfur coupled alkyl phenol compounds, or methylene bridged phenols. Suitable detergents and their methods of preparation are described in greater detail in numerous patent publications, including U.S. Pat. No. 7,732,390 and references cited therein. The detergent substrate may be salted with an alkali or alkaline earth metal such as, but not limited to, calcium, magnesium, potassium, sodium, lithium, barium, or mixtures thereof. In some embodiments, the detergent is free of barium. A suitable detergent may include alkali or alkaline earth metal salts of petroleum sulfonic acids and long chain mono- or di-alkylarylsulfonic acids with the aryl group being benzyl, tolyl, and xylyl. Examples of suitable detergents include, but are not limited to, calcium phenates, calcium sulfur containing phenates, calcium sulfonates, calcium calixarates, calcium salixarates, calcium salicylates, calcium carboxylic acids, calcium phosphorus acids, calcium mono- and/or di-thiophosphoric acids, calcium alkyl phenols, calcium sulfur coupled alkyl phenol compounds, calcium methylene bridged phenols, magnesium phenates, magnesium sulfur containing phenates, magnesium sulfonates, magnesium calixarates, magnesium salixarates, magnesium salicylates, magnesium carboxylic acids, magnesium phosphorus acids, magnesium mono- and/or di-thiophosphoric acids, magnesium alkyl phenols, magnesium sulfur coupled alkyl phenol compounds, magnesium methylene bridged phenols, sodium phenates, sodium sulfur containing phenates, sodium sulfonates, sodium calixarates, sodium salixarates, sodium salicylates, sodium carboxylic acids, sodium phosphorus acids, sodium mono- and/or di-thiophosphoric acids, sodium alkyl phenols, sodium sulfur coupled alkyl phenol compounds, or sodium methylene bridged phenols.

Overbased detergent additives are well known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol.

The terminology "overbased" relates to metal salts, such as metal salts of sulfonates, carboxylates, and phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids, carboxylic acids, or phenols.

An overbased detergent of the lubricating oil composition may have a total base number (TBN) of about 200 mg KOH/gram or greater, or as further examples, about 250 mg KOH/gram or greater, or about 350 mg KOH/gram or greater, or about 375 mg KOH/gram or greater, or about 400 mg KOH/gram or greater.

Examples of suitable overbased detergents include, but are not limited to, overbased calcium phenates, overbased calcium sulfur containing phenates, overbased calcium sulfonates, overbased calcium calixarates, overbased calcium salixarates, overbased calcium salicylates, overbased calcium carboxylic acids, overbased calcium phosphorus acids, overbased calcium mono- and/or di-thiophosphoric acids, overbased calcium alkyl phenols, overbased calcium sulfur coupled alkyl phenol compounds, overbased calcium methylene bridged phenols, overbased magnesium phenates, overbased magnesium sulfur containing phenates, overbased magnesium sulfonates, overbased magnesium calixarates, overbased magnesium salixarates, overbased magnesium salicylates, overbased magnesium carboxylic acids, overbased magnesium phosphorus acids, overbased magnesium mono- and/or di-thiophosphoric acids, overbased magnesium alkyl phenols, overbased magnesium sulfur coupled alkyl phenol compounds, or overbased magnesium methylene bridged phenols.

The overbased detergent may have a metal to substrate ratio of from 1.1:1, or from 2:1, or from 4:1, or from 5:1, or from 7:1, or from 10:1.

In some embodiments, a detergent is effective at reducing or preventing rust in an engine.

The detergent may be present at about 0 wt % to about 10 wt %, or about 0.1 wt % to about 8 wt %, or about 1 wt % to about 4 wt %, or greater than about 4 wt % to about 8 wt %.

Dispersants

The lubricating oil composition may optionally further comprise one or more dispersants or mixtures thereof. Dispersants are often known as ashless-type dispersants because, prior to mixing in a lubricating oil composition, they do not contain ash-forming metals and they do not normally contribute any ash when added to a lubricant. Ashless type dispersants are characterized by a polar group attached to a relatively high molecular weight hydrocarbon chain. Typical ashless dispersants include N-substituted long chain alkenyl succinimides. Examples of N-substituted long chain alkenyl succinimides include polyisobutylene succinimide with number average molecular weight of the polyisobutylene substituent in the range about 350 to about 50,000, or to about 5,000, or to about 3,000. Succinimide dispersants and their preparation are disclosed, for instance in U.S. Pat. No. 7,897,696 or U.S. Pat. No. 4,234,435. The polyolefin may be prepared from polymerizable monomers containing about 2 to about 16, or about 2 to about 8, or about 2 to about 6 carbon atoms. Succinimide dispersants are typically the imide formed from a polyamine, typically a poly(ethyleneamine).

In an embodiment the present disclosure further comprises at least one polyisobutylene succinimide dispersant derived from polyisobutylene with number average molecular weight in the range about 350 to about 50,000, or to about 5000, or to about 3000. The polyisobutylene succinimide may be used alone or in combination with other dispersants.

In some embodiments, polyisobutylene, when included, may have greater than 50 mol %, greater than 60 mol %, greater than 70 mol %, greater than 80 mol %, or greater than 90 mol % content of terminal double bonds. Such PIB is also referred to as highly reactive PIB ("HR-PIB"). HR-PIB having a number average molecular weight ranging from about 800 to about 5000 is suitable for use in embodiments of the present disclosure. Conventional PIB typically has less than 50 mol %, less than 40 mol %, less than 30 mol %, less than 20 mol %, or less than 10 mol % content of terminal double bonds.

An HR-PIB having a number average molecular weight ranging from about 900 to about 3000 may be suitable. Such HR-PIB is commercially available, or can be synthesized by the polymerization of isobutene in the presence of a non-chlorinated catalyst such as boron trifluoride, as described in U.S. Pat. No. 4,152,499 to Boerzel, et al. and U.S. Pat. No. 5,739,355 to Gateau, et al. When used in the aforementioned thermal ene reaction, HR-PIB may lead to higher conversion rates in the reaction, as well as lower amounts of sediment formation, due to increased reactivity. A suitable method is described in U.S. Pat. No. 7,897,696.

In one embodiment the present disclosure further comprises at least one dispersant derived from polyisobutylene succinic anhydride ("PIBSA"). The PIBSA may have an average of between about 1.0 and about 2.0 succinic acid moieties per polymer.

The % actives of the alkenyl or alkyl succinic anhydride can be determined using a chromatographic technique. This method is described in column 5 and 6 in U.S. Pat. No. 5,334,321.

The percent conversion of the polyolefin is calculated from the % actives using the equation in column 5 and 6 in U.S. Pat. No. 5,334,321.

Unless stated otherwise, all percentages are in weight percent and all molecular weights are number average molecular weights.

In one embodiment, the dispersant may be derived from a polyalphaolefin (PAO) succinic anhydride.

In one embodiment, the dispersant may be derived from olefin maleic anhydride copolymer. As an example, the dispersant may be described as a poly-PIBSA.

In an embodiment, the dispersant may be derived from an anhydride which is grafted to an ethylene-propylene copolymer.

One class of suitable dispersants may be Mannich bases. Mannich bases are materials that are formed by the condensation of a higher molecular weight, alkyl substituted phenol, a polyalkylene polyamine, and an aldehyde such as formaldehyde. Mannich bases are described in more detail in U.S. Pat. No. 3,634,515.

A suitable class of dispersants may be high molecular weight esters or half ester amides.

A suitable dispersant may also be post-treated by conventional methods by a reaction with any of a variety of agents. Among these are boron, urea, thiourea, dimercaptothiadiazoles, carbon disulfide, aldehydes, ketones, carboxylic acids, hydrocarbon-substituted succinic anhydrides, maleic anhydride, nitriles, epoxides, carbonates, cyclic carbonates, hindered phenolic esters, and phosphorus compounds. U.S. Pat. Nos. 7,645,726 7,214,649; and 8,048,831 are incorporated herein by reference in their entireties.

In addition to the carbonate and boric acids post-treatments both the compounds may be post-treated, or further post-treatment, with a variety of post-treatments designed to improve or impart different properties. Such post-treatments include those summarized in columns 27-29 of U.S. Pat. No. 5,241,003, hereby incorporated by reference. Such treatments include, treatment with:

Inorganic phosphorous acids or anhydrates (e.g., U.S. Pat. Nos. 3,403,102 and 4,648,980);
Organic phosphorous compounds (e.g., U.S. Pat. No. 3,502, 677);
Phosphorous pentasulfides;
Boron compounds as already noted above (e.g., U.S. Pat. Nos. 3,178,663 and 4,652,387);
Carboxylic acid, polycarboxylic acids, anhydrides and/or acid halides (e.g., U.S. Pat. Nos. 3,708,522 and 4,948, 386);
Epoxides polyepoxiates or thioexpoxides (e.g., U.S. Pat. Nos. 3,859,318 and 5,026,495);
Aldehyde or ketone (e.g., U.S. Pat. No. 3,458,530);
Carbon disulfide (e.g., U.S. Pat. No. 3,256,185);
Glycidol (e.g., U.S. Pat. No. 4,617,137);
Urea, thourea or guanidine (e.g., U.S. Pat. Nos. 3,312,619; 3,865,813; and British Patent GB 1,065,595);
Organic sulfonic acid (e.g., U.S. Pat. No. 3,189,544 and British Patent GB 2,140,811);
Alkenyl cyanide (e.g., U.S. Pat. Nos. 3,278,550 and 3,366, 569);
Diketene (e.g., U.S. Pat. No. 3,546,243);
A diisocyanate (e.g., U.S. Pat. No. 3,573,205);
Alkane sultone (e.g., U.S. Pat. No. 3,749,695);
1,3-Dicarbonyl Compound (e.g., U.S. Pat. No. 4,579,675);
Sulfate of alkoxylated alcohol or phenol (e.g., U.S. Pat. No. 3,954,639);
Cyclic lactone (e.g., U.S. Pat. Nos. 4,617,138; 4,645,515; 4,668,246; 4,963,275; and 4,971,711);
Cyclic carbonate or thiocarbonate linear monocarbonate or polycarbonate, or chloroformate (e.g., U.S. Pat. Nos. 4,612,132; 4,647,390; 4,648,886; 4,670,170);
Nitrogen-containing carboxylic acid (e.g., U.S. Pat. No. 4,971,598 and British Patent GB 2,140,811);
Hydroxy-protected chlorodicarbonyloxy compound (e.g., U.S. Pat. No. 4,614,522);
Lactam, thiolactam, thiolactone or ditholactone (e.g., U.S. Pat. Nos. 4,614,603 and 4,666,460);
Cyclic carbonate or thiocarbonate, linear monocarbonate or plycarbonate, or chloroformate (e.g., U.S. Pat. Nos. 4,612, 132; 4,647,390; 4,646,860; and 4,670,170);
Nitrogen-containing carboxylic acid (e.g., U.S. Pat. No. 4,971,598 and British Patent GB 2,440,811);
Hydroxy-protected chlorodicarbonyloxy compound (e.g., U.S. Pat. No. 4,614,522);
Lactam, thiolactam, thiolactone or dithiolactone (e.g., U.S. Pat. Nos. 4,614,603, and 4,666,460);
Cyclic carbamate, cyclic thiocarbamate or cyclic dithiocarbamate (e.g., U.S. Pat. Nos. 4,663,062 and 4,666,459);
Hydroxyaliphatic carboxylic acid (e.g., U.S. Pat. Nos. 4,482, 464; 4,521,318; 4,713,189);
Oxidizing agent (e.g., U.S. Pat. No. 4,379,064);
Combination of phosphorus pentasulfide and a polyalkylene polyamine (e.g., U.S. Pat. No. 3,185,647);
Combination of carboxylic acid or an aldehyde or ketone and sulfur or sulfur chloride (e.g., U.S. Pat. Nos. 3,390, 086; 3,470,098);
Combination of a hydrazine and carbon disulfide (e.g. U.S. Pat. No. 3,519,564);
Combination of an aldehyde and a phenol (e.g., U.S. Pat. Nos. 3,649,229; 5,030,249; 5,039,307);
Combination of an aldehyde and an O-diester of dithiophosphoric acid (e.g., U.S. Pat. No. 3,865,740);
Combination of a hydroxyaliphatic carboxylic acid and a boric acid (e.g., U.S. Pat. No. 4,554,086);
Combination of a hydroxyaliphatic carboxylic acid, then formaldehyde and a phenol (e.g., U.S. Pat. No. 4,636, 322);
Combination of a hydroxyaliphatic carboxylic acid and then an aliphatic dicarboxylic acid (e.g., U.S. Pat. No. 4,663, 064);
Combination of formaldehyde and a phenol and then glycolic acid (e.g., U.S. Pat. No. 4,699,724);
Combination of a hydroxyaliphatic carboxylic acid or oxalic acid and then a diisocyanate (e.g. U.S. Pat. No. 4,713, 191);
Combination of inorganic acid or anhydride of phosphorus or a partial or total sulfur analog thereof and a boron compound (e.g., U.S. Pat. No. 4,857,214);
Combination of an organic diacid then an unsaturated fatty acid and then a nitrosoaromatic amine optionally followed by a boron compound and then a glycolating agent (e.g., U.S. Pat. No. 4,973,412);
Combination of an aldehyde and a triazole (e.g., U.S. Pat. No. 4,963,278);
Combination of an aldehyde and a triazole then a boron compound (e.g., U.S. Pat. No. 4,981,492);
Combination of cyclic lactone and a boron compound (e.g., U.S. Pat. Nos. 4,963,275 and 4,971,711). The above mentioned patents are herein incorporated in their entireties.

The TBN of a suitable dispersant may be from about 10 to about 65 on an oil-free basis, which is comparable to about 5 to about 30 TBN if measured on a dispersant sample containing about 50% diluent oil.

The dispersant, if present, can be used in an amount sufficient to provide up to about 20 wt %, based upon the final weight of the lubricating oil composition. Another amount of the dispersant that can be used may be about 0.1 wt % to about 15 wt %, or about 0.1 wt % to about 10 wt %, or about 3 wt % to about 10 wt %, or about 1 wt % to about 6 wt %, or about 7 wt % to about 12 wt %, based upon the final weight of the lubricating oil composition. In some embodiments, the lubricating oil composition utilizes a mixed dispersant system. A single type or a mixture of two or more types of dispersants in any desired ratio may be used.

Friction Modifiers

The lubricating oil compositions herein also may optionally contain one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanadine, alkanolamides, phosphonates, metal-containing compounds, glycerol esters, sulfurized fatty compounds and olefins, sunflower oil other naturally occurring plant or animal oils, dicarboxylic acid esters, esters or partial esters of a polyol and one or more aliphatic or aromatic carboxylic acids, and the like.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In some embodiments the friction modifier may be a long chain fatty acid ester. In another embodiment the long chain fatty acid ester may be a mono-ester, or a di-ester, or a (tri)glyceride. The friction modifier may be a long chain fatty amide, a long chain fatty ester, a long chain fatty epoxide derivatives, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685, herein incorporated by reference in its entirety.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291, herein incorporated by reference in its entirety.

A friction modifier may optionally be present in ranges such as about 0 wt % to about 10 wt %, or about 0.01 wt % to about 8 wt %, or about 0.1 wt % to about 4 wt %.

Molybdenum-Containing Component

The lubricating oil compositions herein also may optionally contain one or more molybdenum-containing compounds. An oil-soluble molybdenum compound may have the functional performance of an antiwear agent, an antioxidant, a friction modifier, or mixtures thereof. An oil-soluble molybdenum compound may include molybdenum dithiocarbamates, molybdenum dialkyldithiophosphates, molybdenum dithiophosphinates, amine salts of molybdenum compounds, molybdenum xanthates, molybdenum thioxanthates, molybdenum sulfides, molybdenum carboxylates, molybdenum alkoxides, a trinuclear organo-molybdenum compound, and/or mixtures thereof. The molybdenum sulfides include molybdenum disulfide. The molybdenum disulfide may be in the form of a stable dispersion. In one embodiment the oil-soluble molybdenum compound may be selected from the group consisting of molybdenum dithiocarbamates, molybdenum dialkyldithiophosphates, amine salts of molybdenum compounds, and mixtures thereof. In one embodiment the oil-soluble molybdenum compound may be a molybdenum dithiocarbamate.

Suitable examples of molybdenum compounds which may be used include commercial materials sold under the trade names such as Molyvan 822™, Molyvan™ A, Molyvan 2000™ and Molyvan 855™ from R. T. Vanderbilt Co., Ltd., and Sakura-Lube™ S-165, S-200, S-300, S-310G, S-525, S-600, S-700, and S-710 available from Adeka Corporation, and mixtures thereof. Suitable molybdenum components are described in U.S. Pat. No. 5,650,381; U.S. RE 37,363 E1; U.S. RE 38,929 E1; and U.S. RE 40,595 E1, incorporated herein by reference in their entireties.

Additionally, the molybdenum compound may be an acidic molybdenum compound.

Included are molybdic acid, ammonium molybdate, sodium molybdate, potassium molybdate, and other alkaline metal molybdates and other molybdenum salts, e.g., hydrogen sodium molybdate, MoOCl4, MoO2Br2, Mo2O3Cl6, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897, incorporated herein by reference in their entireties.

Another class of suitable organo-molybdenum compounds are trinuclear molybdenum compounds, such as those of the formula Mo3SkLnQz and mixtures thereof, wherein S represents sulfur, L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685, herein incorporated by reference in its entirety.

The oil-soluble molybdenum compound may be present in an amount sufficient to provide about 0.5 ppm to about 2000 ppm, about 1 ppm to about 700 ppm, about 1 ppm to about 550 ppm, about 5 ppm to about 300 ppm, or about 20 ppm to about 250 ppm of molybdenum.

Transition Metal-Containing Compounds

In another embodiment, the oil-soluble compound may be a transition metal containing compound or a metalloid. The transition metals may include, but are not limited to, titanium, vanadium, copper, zinc, zirconium, molybdenum, tantalum, tungsten, and the like. Suitable metalloids include, but are not limited to, boron, silicon, antimony, tellurium, and the like.

In an embodiment, an oil-soluble transition metal-containing compound may function as antiwear agents, friction modifiers, antioxidants, deposit control additives, or more than one of these functions. In an embodiment the oil-soluble transition metal-containing compound may be an oil-soluble titanium compound, such as a titanium (IV) alkoxide. Among the titanium containing compounds that may be used in, or which may be used for preparation of the oils-soluble materials of, the disclosed technology are various Ti (IV) compounds such as titanium (IV) oxide; titanium (IV) sulfide; titanium (IV) nitrate; titanium (IV) alkoxides such as titanium methoxide, titanium ethoxide, titanium propoxide, titanium isopropoxide, titanium butoxide, titanium 2-ethylhexoxide; and other titanium compounds or complexes including but not limited to titanium phenates; titanium carboxylates such as titanium (IV) 2-ethyl-1-3-hexanedioate or titanium citrate or titanium oleate; and titanium (IV) (triethanolaminato)isopropoxide. Other forms of titanium encompassed within the disclosed technology include titanium phosphates such as titanium dithiophosphates (e.g., dialkyldithiophosphates) and titanium sulfonates (e.g., alkylbenzenesulfonates), or, generally, the reaction product of titanium compounds with various acid materials to form salts, such as oil-soluble salts. Titanium compounds can thus be derived from, among others, organic acids, alcohols, and glycols. Ti compounds may also exist in dimeric or oligomeric form, containing Ti—O—Ti structures. Such titanium materials are commercially available or can be readily prepared by appropriate synthesis techniques which will be apparent to the person skilled in the art. They may exist at room temperature as a solid or a liquid, depending on the particular compound. They may also be provided in a solution form in an appropriate inert solvent.

In one embodiment, the titanium can be supplied as a Ti-modified dispersant, such as a succinimide dispersant. Such materials may be prepared by forming a titanium mixed anhydride between a titanium alkoxide and a hydrocarbyl-substituted succinic anhydride, such as an alkenyl- (or alkyl) succinic anhydride. The resulting titanate-succinate intermediate may be used directly or it may be reacted with any of a number of materials, such as (a) a polyamine-based succinimide/amide dispersant having free, condensable —NH functionality; (b) the components of a polyamine-based succinimide/amide dispersant, i.e., an alkenyl- (or alkyl-) succinic anhydride and a polyamine, (c) a hydroxy-containing polyester dispersant prepared by the reaction of a substituted succinic anhydride with a polyol, aminoalcohol, polyamine, or mixtures thereof. Alternatively, the titanate-succinate intermediate may be reacted with other agents such as alcohols, aminoalcohols, ether alcohols, polyether alcohols or polyols, or fatty acids, and the product thereof either used directly to impart Ti to a lubricant, or else further reacted with the succinic dispersants as described above. As an example, 1 part (by mole) of tetraisopropyl titanate may be reacted with about 2 parts (by mole) of a polyisobutene-substituted succinic anhydride at 140-150° C. for 5 to 6 hours to provide a titanium modified dispersant or intermediate. The resulting material (30 g) may be further reacted with a succinimide dispersant from polyisobutene-substituted succinic anhydride and a polyethylenepolyamine mixture (127 grams+diluent oil) at 150° C. for 1.5 hours, to produce a titanium-modified succinimide dispersant.

Another titanium containing compound may be a reaction product of titanium alkoxide and $C_6$ to $C_{25}$ carboxylic acid. The reaction product may be represented by the following formula:

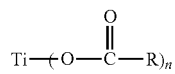

wherein n is an integer selected from 2, 3 and 4, and R is a hydrocarbyl group containing from about 5 to about 24 carbon atoms, or by the formula:

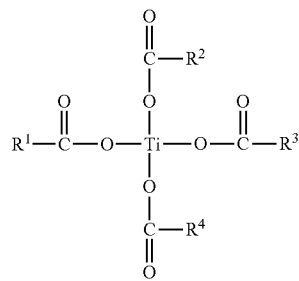

wherein each of $R^1$, $R^2$, $R^3$, and $R^4$ are the same or different and are selected from a hydrocarbyl group containing from about 5 to about 25 carbon atoms. Suitable carboxylic acids may include, but are not limited to caproic acid, caprylic acid, lauric acid, myristic acid, palmitic acid, stearic acid, arachidic acid, oleic acid, erucic acid, linoleic acid, linolenic acid, cyclohexanecarboxylic acid, phenylacetic acid, benzoic acid, neodecanoic acid, and the like.

In an embodiment the oil soluble titanium compound may be present in the lubricating oil composition in an amount to provide from 0 to 3000 ppm titanium by weight or 25 to about 1500 ppm titanium by weight or about 35 ppm to 500 ppm titanium by weight or about 50 ppm to about 300 ppm.

Viscosity Index Improvers

The lubricating oil compositions herein also may optionally contain one or more viscosity index improvers. Suitable viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, polyacrylates, polyacrylates, polyalkyl styrenes, hydrogenated alkenyl aryl conjugated diene copolymers, or mixtures thereof. Viscosity index improvers may include star polymers and suitable examples are described in US Publication No. 20120101017A1.

The lubricating oil compositions herein also may optionally contain one or more dispersant viscosity index improvers in addition to a viscosity index improver or in lieu of a viscosity index improver. Suitable viscosity index improvers may include functionalized polyolefins, for example, ethylene-propylene copolymers that have been functionalized with the reaction product of an acylating agent (such as maleic anhydride) and an amine; polyacrylates functionalized with an amine, or esterified maleic anhydride-styrene copolymers reacted with an amine.

The total amount of viscosity index improver and/or dispersant viscosity index improver may be about 0 wt % to about 20 wt %, about 0.1 wt % to about 15 wt %, about 0.1 wt % to about 12 wt %, or about 0.5 wt % to about 10 wt %, of the lubricating oil composition.

Other Optional Additives

Other additives may be selected to perform one or more functions required of a lubricating fluid. Further, one or more of the mentioned additives may be multi-functional and provide functions in addition to or other than the function prescribed herein.

A lubricating oil composition according to the present disclosure may optionally comprise other performance additives. The other performance additives may be in addition to specified additives of the present disclosure and/or may comprise one or more of metal deactivators, viscosity index improvers, detergents, ashless TBN boosters, friction modifiers, antiwear agents, corrosion inhibitors, rust inhibitors, dispersants, dispersant viscosity index improvers, extreme pressure agents, antioxidants, foam inhibitors, demulsifiers, emulsifiers, pour point depressants, seal swelling agents and mixtures thereof. Typically, fully-formulated lubricating oil will contain one or more of these performance additives.

Suitable metal deactivators may include derivatives of benzotriazoles (typically tolyltriazole), dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polyacrylates, polyacrylates or polyacrylamides.

Suitable foam inhibitors include silicon-based compounds, such as siloxane.

Suitable pour point depressants may include a polymethylacrylates or mixtures thereof. Pour point depressants may be present in an amount sufficient to provide from about 0 wt % to about 1 wt %, about 0.01 wt % to about 0.5 wt %, or about 0.02 wt % to about 0.04 wt % based upon the final weight of the lubricating oil composition.

Suitable rust inhibitors may be a single compound or a mixture of compounds having the property of inhibiting corrosion of ferrous metal surfaces. Non-limiting examples of rust inhibitors useful herein include oil-soluble high molecular weight organic acids, such as 2-ethylhexanoic acid, lauric acid, myristic acid, palmitic acid, oleic acid, linoleic acid, linolenic acid, behenic acid, and cerotic acid, as well as oil-soluble polycarboxylic acids including dimer and trimer acids, such as those produced from tall oil fatty acids, oleic acid, and linoleic acid. Other suitable corrosion inhibitors include long-chain alpha, omega-dicarboxylic acids in the molecular weight range of about 600 to about 3000 and alkenylsuccinic acids in which the alkenyl group contains about 10 or more carbon atoms such as, tetrapropenylsuccinic acid, tetradecenylsuccinic acid, and hexadecenylsuccinic acid. Another useful type of acidic corrosion inhibitors are the half esters of alkenyl succinic acids having about 8 to about 24 carbon atoms in the alkenyl group with alcohols such as the polyglycols. The corresponding half amides of such alkenyl succinic acids are also useful. A useful rust inhibitor is a high molecular weight organic acid. In some embodiments, an engine oil is devoid of a rust inhibitor.

The rust inhibitor, if present, can be used in an amount sufficient to provide about 0 wt % to about 5 wt %, about 0.01 wt % to about 3 wt %, about 0.1 wt % to about 2 wt %, based upon the final weight of the lubricating oil composition.

In general terms, a suitable crankcase lubricant may include additive components in the ranges listed in the following table.

TABLE 1

| Component | Wt. % (Suitable Embodiments) | Wt. % (Suitable Embodiments) |
| --- | --- | --- |
| Dispersant(s) | 0.1–10.0 | 1.0–8.5 |
| Antioxidant(s) | 0.1–5.0 | 0.01–3.0 |
| Detergent(s) | 0.1–15.0 | 0.2–8.0 |
| Ashless TBN booster(s) | 0.0–1.0 | 0.01–0.5 |
| Corrosion inhibitor(s) | 0.0–5.0 | 0.0–2.0 |
| Metal dihydrocarbyldithiophosphate(s) | 0.1–6.0 | 0.1–4.0 |
| Ash-free phosphorus compound(s) | 0.0–6.0 | 0.0–4.0 |
| Antifoaming agent(s) | 0.0–5.0 | 0.001–0.15 |
| Antiwear agent(s) | 0.0–1.0 | 0.0–0.8 |
| Pour point depressant(s) | 0.0–5.0 | 0.01–1.5 |
| Viscosity index improver(s) | 0.0–20.0 | 0.25–10.0 |
| Dispersant viscosity index improver(s) | 0.0–10.0 | 0.0–5.0 |
| Friction modifier(s) | 0.01–5.0 | 0.05–2.0 |
| Base oil(s) | Balance | Balance |
| Total | 100 | 100 |

The percentages of each component above represent the weight percent of each component, based upon the weight of the final lubricating oil composition. The remainder of the lubricating oil composition consists of one or more base oils.

Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent).

The disclosure also includes a method for reducing friction in an engine, including supplying to the engine a lubricating oil composition that contains a random copolymer obtained from polymerizing a monomer composition, wherein the monomer composition is as described above.

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety.

Example 1

In a 500 ml resin kettle equipped with mechanical stirrer, thermometer, chilled condenser, and inert gas inlet, 9.1 grams (0.09 mole) of methyl acrylate(MMA), 239.8 grams (0.91 mole) of lauryl acrylate(mixture of n-dodecyl acrylate and n-tetradecyl acrylate, LMA), 71.5 grams (0.55 mole) of 2-hydroxyethyl acrylate(HEMA), 40.0 grams (0.20 mole) of n-dodecanethiol, and 40.0 grams of mineral oil was charged. The entire mixture was sparged with nitrogen then was heated to 75° C. under stirring, then 1.1 grams (0.006 mole) of Vazo® 67 was charged and the polymerization is maintained at 80~85° C. for 4 hours. The reaction was terminated and was allowed cooling down before discharging. A clear and low viscosity polymer solution was obtained. The structure of the polymer was analyzed by means of gel permeation chromatography.

Example 2 to 6

Samples were prepared with same procedure as shown in Example 1 except the amount of monomers charged in the reaction.

Comparative Example 1

A block copolymer was prepared by RAFT polymerization in the similar reaction setup. The sample is prepared by initially reacting a monomer mixture with 210.5 grams (0.8 mole) of lauryl acrylate(mixture of n-dodecyl acrylate and n-tetradecyl acrylate, LMA), 1.2 grams (10 mmole) of 4-Cyano-4-(dodecylsulfanylthiocarbonyl)sulfanylpentanoic acid dispersed in 80.6 grams of mineral oil. The polymerization was initiated with 1.2 grams (6 mmole) of Vazo® 67 at 80~85° C. After 4 hrs reaction, 26.0 grams (0.2 mole) of 2-hydroxyethyl acrylate was added with 0.3 grams (1.5 mmole) of additional Vazo® 67 charged. The reaction was maintained for another 3 hours then was terminated and sample was analyzed.

Comparative Examples 2

Samples were prepared in the same manner as Comparative Example 1 mentioned above with the exception that all monomers were charged all at once.

Comparative Examples 3 to 6

Samples were prepared with same procedure as shown in Example 1 except the amount of monomers charged in the reaction.

TABLE 2

Composition and structure of polymer additive samples

| | Type of monomers | Monomer molar ratio (MMA:LMA:HEMA) | Molecular weight, Mn | Polymer type |
|---|---|---|---|---|
| Example 1 | MMA, LMA, HEMA | 6:59:35 | 3,000 | Random polymer |
| Example 2 | Same as above | 7:68:25 | 3,000 | Same as above |
| Example 3 | Same as above | 39:38:23 | 3,000 | Same as above |
| Example 4 | Same as above | 8:82:10 | 3,000 | Same as above |
| Example 5 | Same as above | 30:60:10 | 3,000 | Same as above |
| Example 6 | Same as above | 53:36:11 | 2,000 | Same as above |
| Comparative Example 1 | LMA, HEMA | 0:80:20 | 24,000 | Same as above |
| Comparative Example 2 | LMA, HEMA | 0:80:20 | 23,000 | Block polymer |
| Comparative Example 3 | MMA, LMA, HEMA | 9:91:0 | 3,000 | Random polymer |
| Comparative Example 4 | Same as above | 9:91:0 | 11,000 | Same as above |
| Comparative Example 5 | Same as above | 33:67:0 | 3,000 | Same as above |
| Comparative Example 6 | Same as above | 33:67:0 | 9,000 | Same as above |

Sample Evaluation with MTM

The above mentioned sample were heated and dissolved in Motiva Star 4 base oil containing 1 wt % of HiTEC® 7169 additive followed by measuring the coefficients of friction with mini traction machine(MTM). All polymers were evaluated at 0.5 wt % active polymer concentration in the final solution.

TABLE 3

Test instrument parameters for the MTM friction test

| Test Rig | PCS MTM |
|---|---|
| Disk | Steel, AISI 52100, diameter = 40.0 mm |
| | RMS = 25-30 nm, |
| | Rockwell C hardness = 63 |
| | Elastic modulus = 207 GPa |
| Ball | Steel, AISI 52100, diameter = 19.0 mm |
| | RMS = 10-13 nm, |
| | Rockwell C hardness = 58-65 |
| | Elastic modulus = 207 GPa |

A panel of samples was created using a series random copolymers having short chain acrylates, long chain acrylates, and/or polar acrylates. The short chain acrylate included was methyl acrylate. Two long chain acrylates were included: a lauryl-myristyl acrylate ($C_{12}$-$C_{14}$) and a cetyl-eicosyl acrylate ($C_{16}$-$C_{20}$). The polar acrylate included was hydroxyethyl acrylate. The characteristics of each of the samples prepared are summarized in the Table below.

| Entry | SC/LC (C1/C12) | Methyl Acrylate (mole %) | Lauryl-Myrstyl Acrylate (mole %) | Cetyl-Eicosyl Acrylate (mole %) | 2-Hydroxyethyl Acrylate (mole %) | Mw | Mn | PDI |
|---|---|---|---|---|---|---|---|---|
| 1 | 0.1 | 9.0% | 91.0% | 0.0% | 0.0% | 4035 | 3022 | 1.34 |
| 2 | 0.1 | 9.0% | 91.0% | 0.0% | 0.0% | 17014 | 10723 | 1.59 |
| 3 | 0.1 | 8.0% | 82.0% | 0.0% | 10.0% | 3983 | 2971 | 1.34 |
| 4 | 0.1 | 8.0% | 82.0% | 0.0% | 10.0% | 16929 | 10407 | 1.63 |
| 5 | 0.5 | 33.0% | 67.0% | 0.0% | 0.0% | 3521 | 2696 | 1.31 |
| 6 | 0.5 | 33.0% | 67.0% | 0.0% | 0.0% | 15056 | 9359 | 1.61 |
| 7 | 0.5 | 30.0% | 60.0% | 0.0% | 10.0% | 3614 | 2707 | 1.34 |
| 8 | 0.5 | 30.0% | 60.0% | 0.0% | 10.0% | 15490 | 9445 | 1.64 |
| 9 | 0.3 | 22.0% | 73.0% | 0.0% | 5.0% | 8525 | 5749 | 1.48 |
| 10 | 0.5 | 18.0% | 36.0% | 0.0% | 46.0% | 4022 | 2596 | 1.55 |
| 11 | 1.5 | 33.0% | 22.0% | 0.0% | 46.0% | 3392 | 2335 | 1.45 |
| 12 | 1.5 | 53.0% | 35.0% | 0.0% | 11.0% | 3354 | 2418 | 1.39 |
| 13 | 1.0 | 36.0% | 36.0% | 0.0% | 28.0% | 3832 | 2571 | 1.49 |
| 14 | 1.0 | 42.0% | 42.0% | 0.0% | 17.0% | 3786 | 2692 | 1.41 |
| 15 | 1.0 | 39.0% | 39.0% | 0.0% | 23.0% | 3847 | 2684 | 1.43 |
| 16 | 0.1 | 7.0% | 68.0% | 0.0% | 25.0% | 4253 | 2895 | 1.47 |
| 17 | 0.1 | 7.0% | 68.0% | 0.0% | 25.0% | 17702 | 10500 | 1.69 |
| 18 | 0.1 | 7.0% | 68.0% | 0.0% | 25.0% | 97063 | 46840 | 2.07 |
| 19 | 0.0 | 0.0% | 100.0% | 0.0% | 0.0% | 4526 | 3291 | 1.38 |
| 20 | 0.1 | 4.6% | 45.6% | 0.0% | 49.9% | 4128 | 2664 | 1.55 |
| 21 | 0.3 | 12.1% | 47.5% | 0.0% | 40.4% | 4321 | 2666 | 1.62 |
| 22 | 0.0 | 0.0% | 47.7% | 0.0% | 52.3% | 4383 | 2741 | 1.60 |
| 23 | 0.0 | 0.0% | 54.9% | 0.0% | 45.1% | 4592 | 2881 | 1.59 |
| 24 | 0.1 | 8.8% | 88.4% | 0.0% | 2.7% | 4142 | 3037 | 1.36 |
| 25 | 0.1 | 8.7% | 86.3% | 0.0% | 5.1% | 4112 | 2997 | 1.37 |
| 26 | 0.1 | 9.0% | 0.0% | 89.8% | 1.2% | 5100 | 3679 | 1.39 |
| 27 | 0.1 | 8.9% | 0.0% | 88.6% | 2.5% | 5126 | 3668 | 1.40 |
| 28 | 0.1 | 8.2% | 0.0% | 81.6% | 10.2% | 5167 | 3639 | 1.42 |
| 29 | 0.1 | 8.6% | 86.4% | 0.0% | 5.0% | 104126 | 57066 | 1.82 |
| 30 | 0.1 | 8.2% | 81.9% | 0.0% | 9.9% | 108184 | 48359 | 2.24 |
| 31 | 0.8 | 34.3% | 42.9% | 0.0% | 22.7% | 3731 | 2581 | 1.45 |

-continued

| Entry | SC/LC (C1/C12) | Methyl Acrylate (mole %) | Lauryl-Myrstyl Acrylate (mole %) | Cetyl-Eicosyl Acrylate (mole %) | 2-Hydroxyethyl Acrylate (mole %) | Mw | Mn | PDI |
|---|---|---|---|---|---|---|---|---|
| 32 | 0.8 | 26.6% | 33.2% | 0.0% | 40.2% | 4420 | 2749 | 1.61 |
| 33 | 0.1 | 5.9% | 58.8% | 0.0% | 35.4% | 4627 | 3017 | 1.53 |
| 34 | 0.1 | 6.8% | 68.1% | 0.0% | 25.1% | 126203 | 49173 | 2.57 |
| 35 | 0.6 | 28.9% | 48.1% | 0.0% | 23.0% | 3826 | 2655 | 1.44 |
| 36 | 0.6 | 26.2% | 43.8% | 0.0% | 30.0% | 4124 | 2733 | 1.51 |

In an initial comparison, a disclosed random copolymer as compared versus two comparative polymer materials. Example 1 contained 5.9 mole % methyl acrylate, 58.8 mole % lauryl-myristyl acrylate, and 35.4 mole % hydroxyethyl acrylate. The random copolymer had a $M_w$=4627, an $M_n$=3017, and a polydispersity of 1.53. The sample was compared against a random copolymer of 80 mole % lauryl-myristyl acrylate and 20 mole % hydroxyethyl acrylate, with a $M_w$=28,500 (Comparative Example 1), and a diblock copolymer of 80 mole % lauryl-myristyl acrylate and 20 mole % hydroxyethyl acrylate, with a $M_w$=26,600 (Comparative Example 2). Each sample was tested in a lubricant composition at a treatment rate 0.5 weight %, with 1 weight % zinc dithiophosphate (ZDDP.) Samples were tested at 125° C., 30 N, and 20% SRR. The curves for the coefficient of friction versus speed shown in FIG. 1 demonstrate a significant improvement using the disclosed random copolymer.

Figure 2:
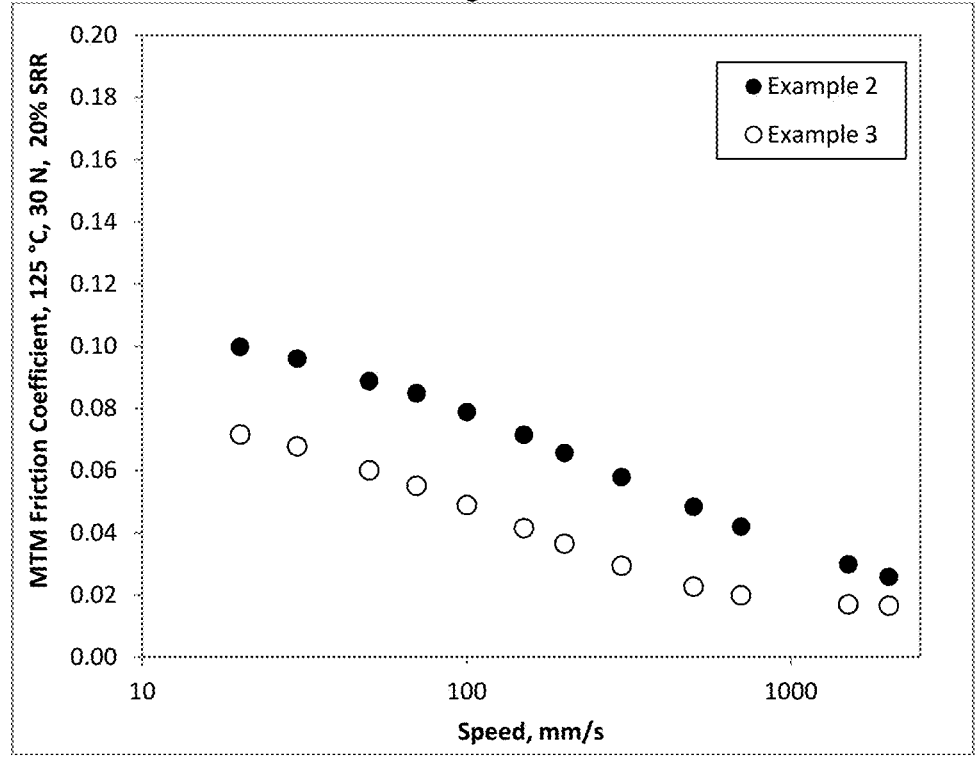
FIG. 2 illustrates a graph coefficient of friction versus speed for random copolymers, in accordance with an exemplary embodiment of the disclosure.

A comparison of two disclosed copolymers demonstrates the friction reduction of different samples. Samples of lubricants with the following random copolymers were prepared and tested. Example 2 contained about 7% methyl acrylate, 68% lauryl-myristyl acrylate and 25 mole % hydroxyethyl acrylate, with an $M_n$ of 2895, an $M_w$ of 4253, and a PDI of 1.47. Example 3 contained about 39% methyl acrylate, 38% lauryl-myristyl acrylate and 23 mole % hydroxyethyl acrylate, with an $M_n$ of 2684, an $M_w$ of 3847, and a PDI of 1.43. The curves for the coefficient of friction versus speed are shown in FIG. 2.

Figure 3:
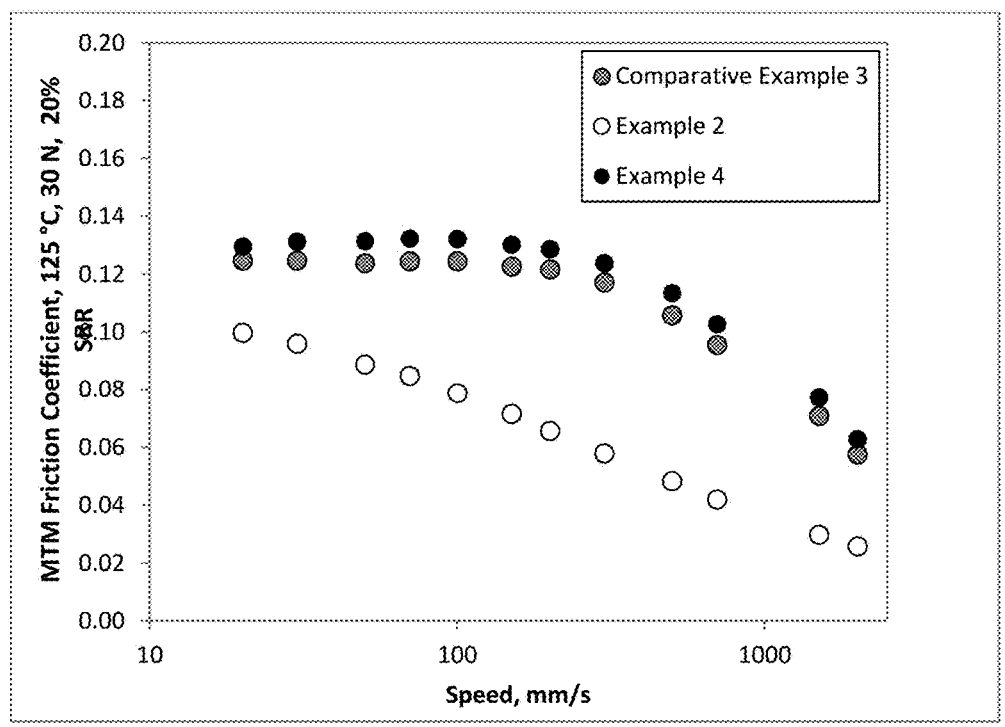
FIG. 3 illustrates a graph of friction coefficient versus speed for random copolymers, in accordance with an exemplary embodiment of the disclosure

A comparison of three samples demonstrates the effectiveness of a polar component in the random copolymer. Samples of lubricants with the following random copolymers were prepared and tested: Comparative Example 3 with 0 mole % hydroxyethyl acrylate, Example 4 with 10 mole % hydroxyethyl acrylate, and Example 2 with 25 mole % hydroxyethyl acrylate. The curves for the coefficient of friction versus speed are shown in FIG. 3.

Figure 4A:
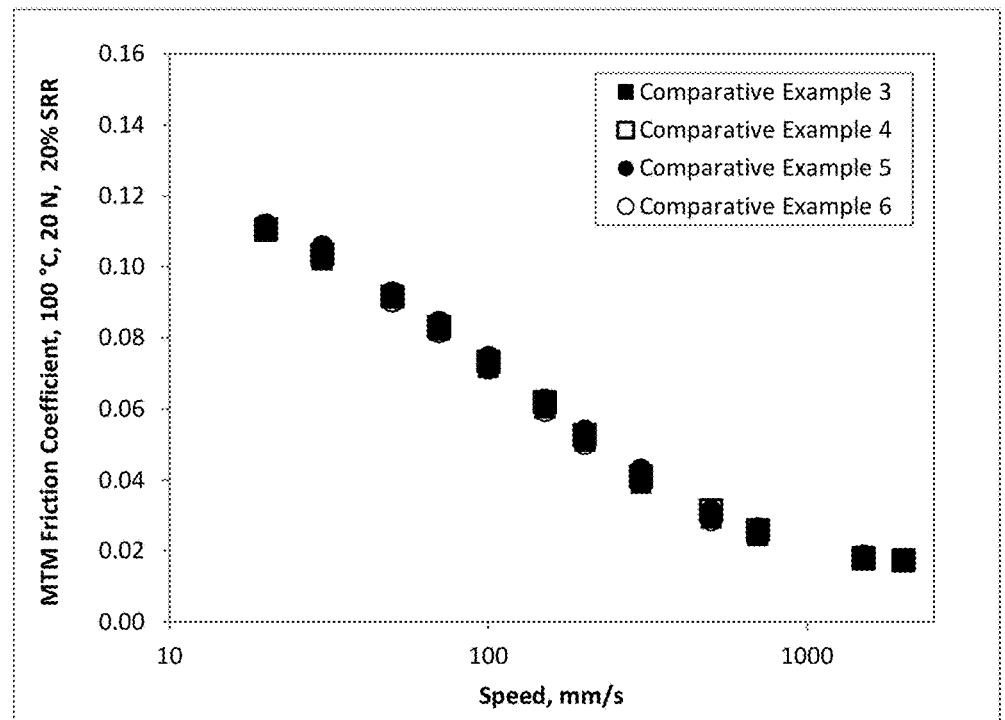
FIGS. 4A, 4B and 4C illustrate graphs coefficient of friction versus speed for random copolymers, in accordance with an exemplary embodiment of the disclosure.
Figure 4B:
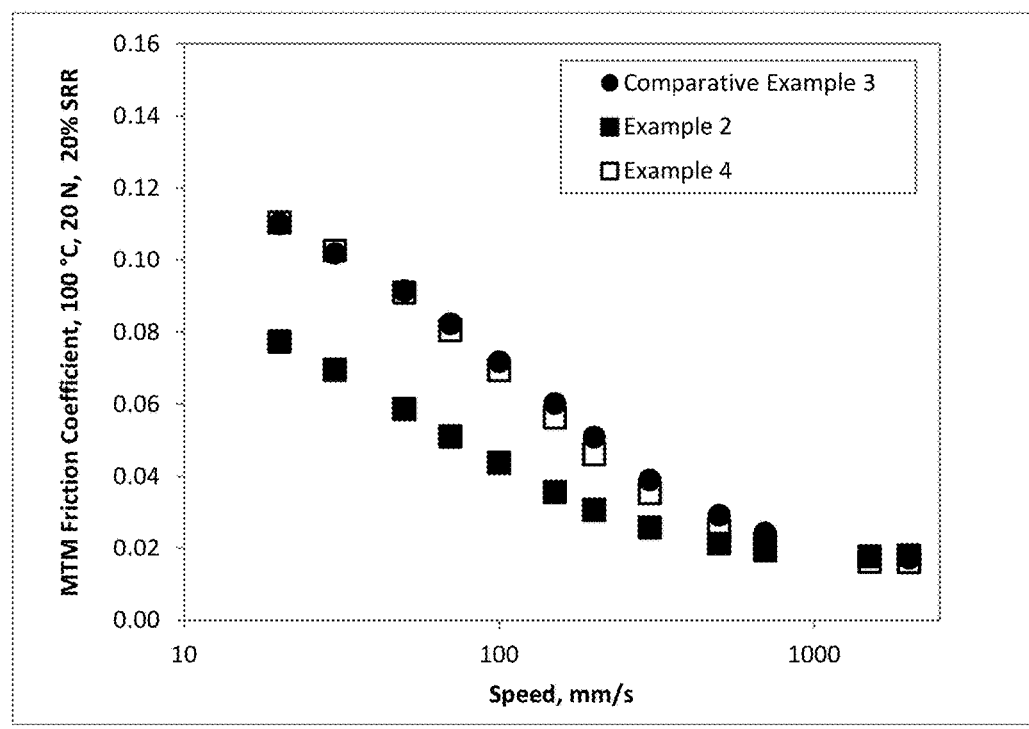
Figure 4C:
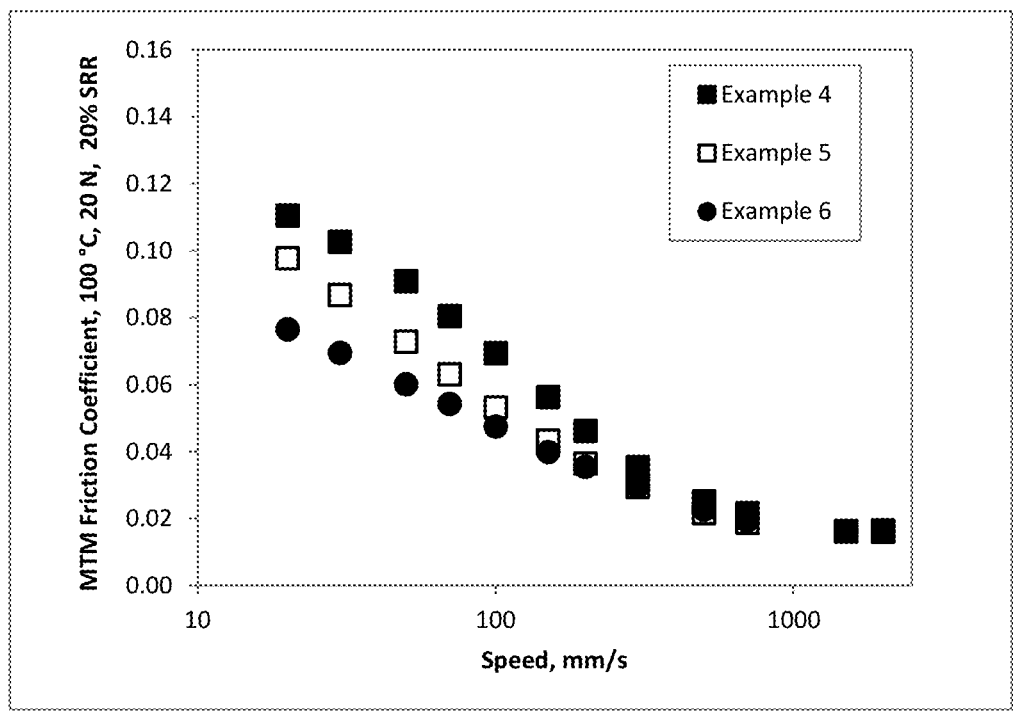

A comparison of four formulations, each without a polar acrylate, demonstrate that neither $M_n$ nor the ratio of short chain to long chain impact performance in the absence of a polar acrylate. Four samples were prepared having no polar acrylate. Comparative Examples 3, 4, 5, and 6 show no effect on friction modification, as demonstrated in FIG. 4A. In contrast to the above four samples, the effect of the polar acrylate can be shown in the comparison of Comparative Example 3 with (Example 2) and Example 4, at 100° C., 20N, and 20% SRR, for three samples each at about $M_n$=3000, and a short chain to long chain ratio of 0.1, as shown in FIG. 4B. Finally, modifying the short chain to long chain ratio can impact performance. Examples 4, 5, and 6, having about 10 mole % polar acrylate, an $M_n$~3000, and varying the short chain to long chain ratio, also demonstrate improvements in friction reduction, as shown in FIG. 4C.

Figure 5A:
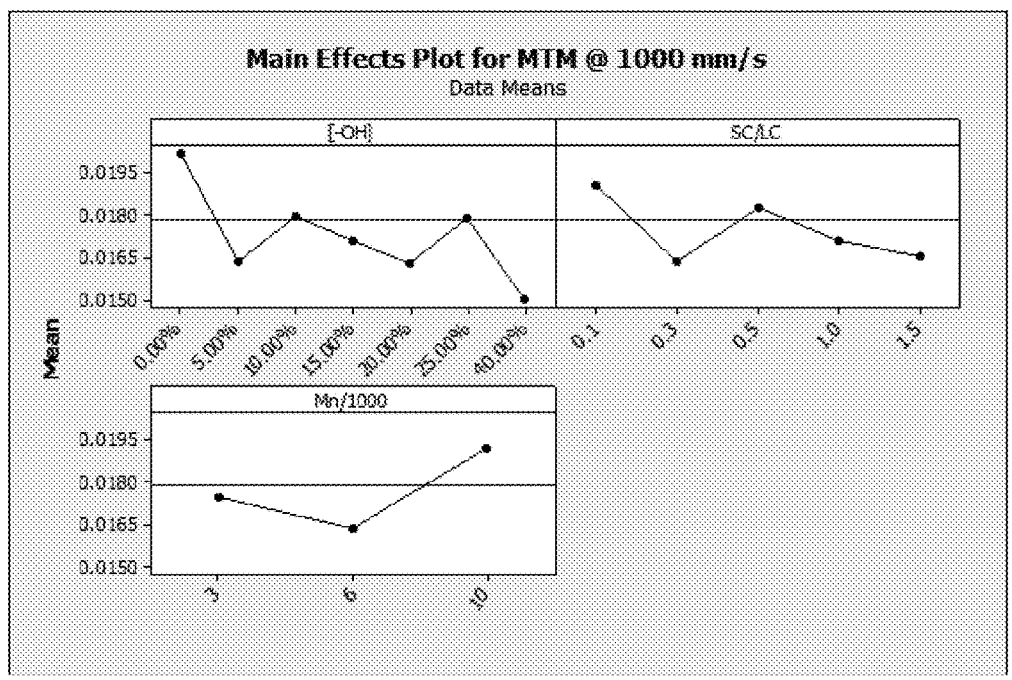
FIGS. 5A and 5B illustrate graphs of trends for random copolymers, in accordance with an exemplary embodiment of the disclosure.
Figure 5B:
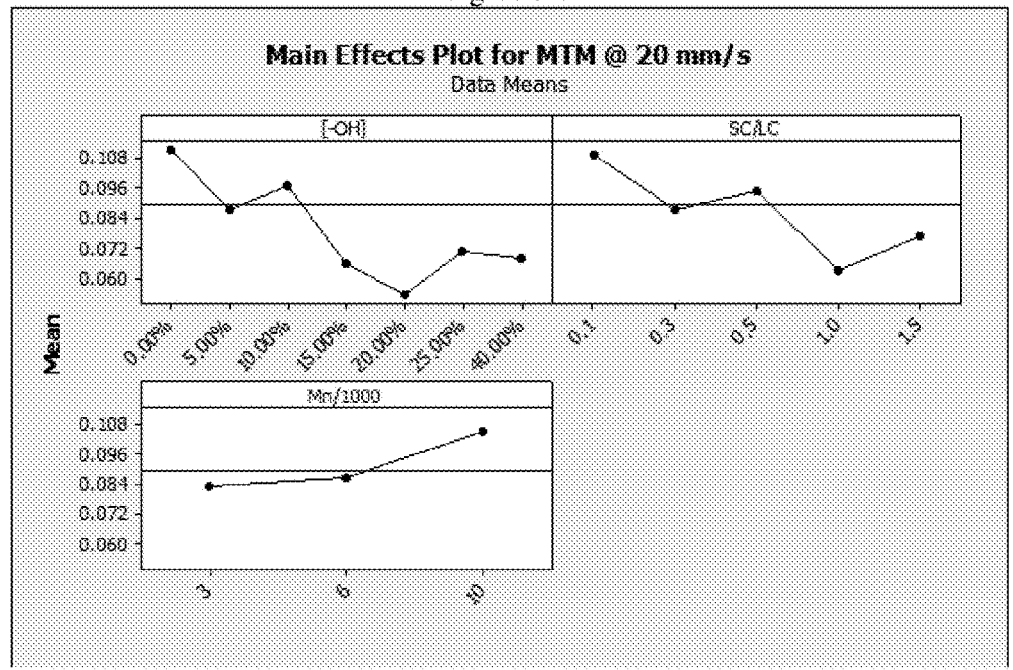

Comparisons of several test samples demonstrate that the random copolymers disclosed herein function at both high speed and low speed conditions. See FIGS. 5A and 5B. At each point, improvements can be demonstrated at higher levels of polar acrylate, higher ratios of short chain to long chain acrylates, and lower $M_n$.

EMBODIMENTS

Additionally or alternatively, the disclosure can include one or more of the following embodiments.

Embodiment 1. A random copolymer obtained from polymerizing an acrylate monomer composition, wherein the monomer composition comprises a) from greater than 0 to about 60 mole % of at least one short chain acrylate of Formula (I)

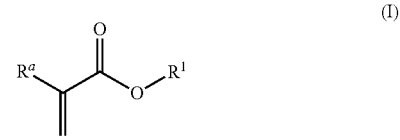

in which $R^a$ can be hydrogen or methyl, and $R^1$ can be a linear or branched $C_1$ to $C_{10}$ alkyl radical;

b) from about 0 to about 94 mole % of at least one long chain acrylate of Formula (II),

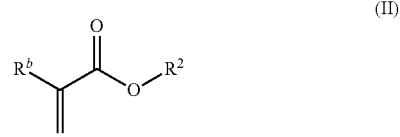

in which $R^b$ can be hydrogen or methyl, and $R^2$ can be a linear or branched $C_{11}$ to $C_{15}$ alkyl radical;

c) from about 0 to about 94% of at least one long chain acrylate of Formula (III)

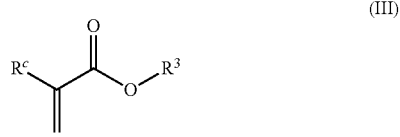

in which $R^c$ can be hydrogen or methyl, and $R^3$ can be a linear or branched $C_{16}$ to $C_{30}$ alkyl radical; and d) from about 5 to about 60 mole % of at least one polar acrylate of Formula (IV),

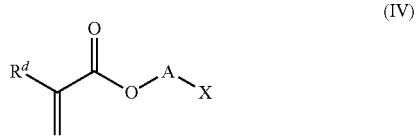

(IV)

in which $R^d$ can be hydrogen or methyl, A can be a linear or branched $C_2$ to $C_6$ alkyl radical, aromatic radical, or a polyether of the formula $(-CHR^4CH_2-O-)_n$ where $R^4$ can be hydrogen or methyl and n can be from 1 to 10; and X can be COOH, OH, or $NR^{21}R^{22}$;
wherein
the long chain acrylates of component b) and component c) together total from about 35 mol % to 94 mole % of the acrylate monomers;
the ratio of short chain acrylate to long chain acrylate can be from about 0 to about 2; and
the copolymer has an $M_n$ of about 1000 to about 15,000 g/mol.

Embodiment 2. A polymeric friction modifier obtained from polymerizing an acrylate monomer composition, wherein the monomer composition comprises Formulas (I), (II), (III), and (IV), as defined in Embodiment 1.

Embodiment 3. A lubricating oil composition comprising a base oil, and at least one additive having friction-modifying properties; wherein the at least one additive having friction-modifying properties can be a random copolymer obtained from polymerizing an acrylate monomer composition, monomer composition comprising Formulas (I), (II), (III), and (IV), as defined in Embodiment 1.

Embodiment 4. A method for reducing friction in an engine, comprising supplying to the engine a lubricating oil composition that includes a random copolymer or a polymeric friction modifier obtained from polymerizing an acrylate monomer composition comprising Formulas (I), (II), (III), and (IV), as defined in Embodiment 1.

Embodiment 5. A process for preparing a random copolymer or a polymeric friction modifier comprising polymerizing an acrylate monomers composition, monomer composition comprising Formulas (I), (II), (III), and (IV), as defined in Embodiment 1.

Embodiment 6. The compositions, methods and processes of any of the previous embodiments, wherein $R^1$ can be $C_1$ to $C_8$, $C_1$ to $C_6$, or $C_1$ to $C_4$, ethyl, or methyl. $R^1$ can be methyl.

Embodiment 7. The compositions, methods and processes of any of the previous embodiments, wherein an $R^2$ which can be a linear or branched alkyl radical of $C_{11}$ to $C_{15}$, including $C_{12}$ to $C_{15}$, or $C_{12}$ to $C_{14}$.

Embodiment 8. The compositions, methods and processes of any of the previous embodiments, wherein an $R^3$ can be a linear or branched alkyl radical of $C_{16}$ to $C_{30}$, $C_{16}$ to $C_{24}$, or $C_{16}$ to $C_{20}$.

Embodiment 9. The compositions, methods and processes of any of the previous embodiments, wherein A can be $(CH_2)_m$, a linear or branched $C_2$ to $C_6$ alkyl radical, aromatic radical, a polyether of the formula $(-CHR^4CH_2-O-)_n$ or combinations thereof. A can be a linear or branched $C_2$ to $C_6$ radical, or a linear or branched $C_2$ to $C_4$ radical. A can be $-CH_2CH_2-$.

Embodiment 10. The compositions, methods and processes of any of the previous embodiments, wherein X can be COOH, OH, or $NR^{21}R^{22}$. X can be $-OH$.

Embodiment 11. The compositions, methods and processes of any of the previous embodiments, wherein at least one of $R^a$, $R^b$, $R^c$ and $R^d$ can be methyl, or wherein each of $R^a$, $R^b$, $R^c$ and $R^d$ is methyl.

Embodiment 12. The compositions, methods and processes of any of the previous embodiments, wherein the short chain acrylate can be at least about 1 mole %, 2 mole % or 3 mole % of the composition. The short chain acrylate can be less than about 60 mole %, less than about 55 mole %, or less than about 50 mole % of the composition.

Embodiment 13. The compositions, methods and processes of any of the previous embodiments, wherein the long chain acrylates can be at least about 25 mole %, at least about 30 mole %, at least about 35 mole %, at least about 45 mole %, or at least about 50 mole % of the monomer composition, and less than about 95 mole %, less than about 90 mole %, less than about 85 mole %, less than about 75 mole %, or less than about 75 mole %.

Embodiment 14. The compositions, methods and processes of any of the previous embodiments, wherein the polar acrylates can be at least about 5 mole %, at least about 7 mole %, at least about 10 mole %, at least about 15 mole %, or at least about 20 mole % of the composition. The polar acrylate group can be less than about 60 mole %, less than about 50 mole %, less than about 45 mole %, or less than about 40 mole % of the composition.

Embodiment 15. The compositions, methods and processes of any of the previous embodiments, wherein the $M_n$ can be about 1000 to about 10000 g/mol, about 2,000 to about 10,000, from about 2,000 to about 8,000, or from about 3,000 to about 8,000.

Embodiment 16. The compositions, methods and processes of any of the previous embodiments, wherein the ratio of short chain to long chain acrylates can be about 0.1 to about 2, from about 0.3 to about 2, from about 0.1 to about 1.5, from about 0.3 to about 1.5, or from about 0.5 to about 1.5.

Embodiment 17. The compositions, methods and processes of any of the previous embodiments, wherein $R^1$ can be methyl, A can be $-CH_2CH_2-$, and X can be $-OH$.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

We claim:

1. A random copolymer obtained from polymerizing an acrylate monomer composition, wherein the monomer composition comprises:

a) from about 5 to about 55 mole % of at least one short chain acrylate of Formula (I),

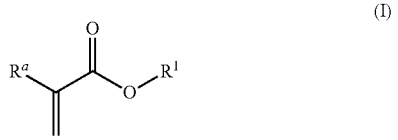

in which $R^a$ is hydrogen or methyl, and $R^1$ is a linear or branched $C_1$ to $C_{10}$ alkyl radical;

b) from about 0 to less than about 75 mole % of at least one long chain acrylate of Formula (II),

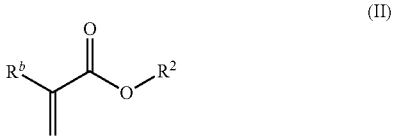

in which $R^b$ is hydrogen or methyl, and $R^2$ is a linear or branched $C_{11}$ to $C_{15}$ alkyl radical;

c) from about 0 to less than about 75 mole % of at least one long chain acrylate of Formula (III),

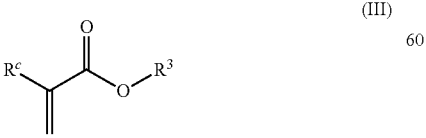

in which $R^c$ is hydrogen or methyl, and $R^3$ is a linear or branched $C_{16}$ to $C_{30}$ alkyl radical; and d) from about 5 to about 50 mole % of at least one polar acrylate of Formula (IV),

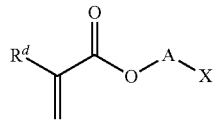

in which $R^d$ is hydrogen or methyl, A is a linear or branched $C_2$ to $C_6$ alkyl radical, aromatic radical, or a polyether of the formula $(-CHR^4CH_2-O-)_n$ where $R^4$ is hydrogen or methyl and n is from 1 to 10; and X is COOH or OH;

wherein, at least one of $R^a$, $R^b$, $R^c$, and $R^d$ is methyl;
    the long chain acrylate of component b) and component c) together total from about 35 mole % to about 75 mole % of the acrylate monomers;
    the ratio of short chain acrylate to long chain acrylate is from about 0.05 to about 2; and
    the copolymer has an $M_n$ of 1000 to 8000 g/mol.

2. The random copolymer of claim 1, where each of $R^a$, $R^b$, $R^c$, and $R^d$ is methyl.

3. The random copolymer of claim 1, wherein $R^1$ is methyl.

4. The random copolymer of claim 1, comprising at least about 5 to about 45 mole % of the short chain acrylate.

5. The random copolymer of claim 1, wherein $M_n$ is 2000 to 8000 g/mol.

6. The random copolymer of claim 1, wherein $R^2$ is a linear or branched $C_{12}$ to $C_{14}$ alkyl radical, and $R^3$ is a linear or branched $C_{16}$ to $C_{20}$ alkyl radical.

7. The random copolymer of claim 1, wherein A is a linear or branched $C_2$ to $C_4$ alkyl radical or a polyether of the formula $(-CHR^4CH_2-O-)_n$ where $R^4$ is hydrogen or methyl and n=1 to 4.

8. The random copolymer of claim 1, wherein A is a $-CH_2CH_2-$.

9. The random copolymer of claim 1, comprising from about 10 to about 50 mole % of the polar acrylate.

10. The random copolymer of claim 1, comprising from about 35 to about 70 mole % of the long chain acrylate of component b) and component c) together.

11. The random copolymer of claim 1, wherein the ratio of short chain acrylate to long chain acrylate is about 0.3 to about 1.5.

12. The random copolymer of claim 1, wherein
    $R^1$ is methyl or butyl;
    $R^2$ is lauryl-myristyl or lauryl;
    $R^3$ is cetyl-eicosyl; and
    A-X is 2-hydroxyethyl.

13. The random copolymer of claim 12, wherein the $M_n$ is 2000 to 8000 g/mol and the ratio of short chain acrylate to long chain acrylate is about 0.1 to about 1.5.

14. A lubricating oil composition, comprising:
    a base oil, and
    at least one additive having friction-modifying properties;
    wherein the at least one additive having friction-modifying properties is a random copolymer obtained from polymerizing an acrylate monomer composition, the monomer composition comprising
    a) from about 5 to about 55 mole % of at least one short chain acrylate of Formula (I),

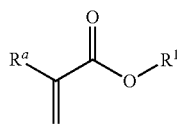

(I)

in which $R^a$ is hydrogen or methyl, and $R^1$ is a linear or branched $C_1$ to $C_{10}$ alkyl radical;
  b) from about 0 to less than about 75 mole % of at least one long chain acrylate of Formula (II),

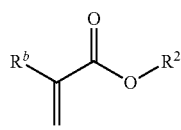

(II)

in which $R^b$ is hydrogen or methyl, and $R^2$ is a linear or branched $C_{11}$ to $C_{15}$ alkyl radical;
  c) from about 0 to less than about 75 mole % of at least one long chain acrylate of Formula (III),

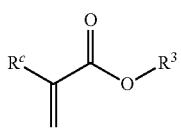

(III)

in which $R^c$ is hydrogen or methyl, and $R^3$ is a linear or branched $C_{16}$ to $C_{30}$ alkyl radical; and
  d) from about 5 to about 50 mole % of at least one polar acrylate of Formula (IV),

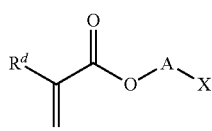

(IV)

in which $R^d$ is hydrogen or methyl, A is a linear or branched $C_2$ to $C_6$ alkyl radical, aromatic radical, or a polyether of the formula $(-CHR^4CH_2-O-)_n$ where $R^4$ is hydrogen or methyl and n is from 1 to 10; and X is COOH or OH; wherein,
  at least one of $R^a$, $R^b$, $R^c$, and $R^d$ is methyl;
  the long chain acrylate of component b) and component c) together total from about 35 mole % to about 75 mole % of the acrylate monomers;
  the ratio of short chain acrylate to long chain acrylate is from about 0.05 to about 2; and
  the copolymer has an $M_n$ of 1000 to 8000 g/mol.

15. The lubricating oil composition of claim 1, where each of $R^a$, $R^b$, $R^c$, and $R^d$ is methyl.

16. The lubricating oil composition of claim 14, wherein $R^1$ is methyl.

17. The lubricating oil composition of claim 14, comprising at least about 5 to about 45 mole % of the short chain acrylate.

18. The lubricating oil composition of claim 14, wherein $M_n$ is 2000 to 8000 g/mol.

19. The lubricating oil composition of claim 14, wherein $R^2$ is a linear or branched $C_{12}$ to $C_{14}$ alkyl radical, and $R^3$ is a linear or branched $C_{16}$ to $C_{20}$ alkyl radical.

20. The lubricating oil composition of claim 14, wherein A is a linear or branched $C_2$ to $C_4$ alkyl radical or a polyether of the formula $(-CHR^4CH_2-O-)_n$, where $R^4$ is hydrogen or methyl and n=1 to 4.

21. The lubricating oil composition of claim 14, wherein A is a $-CH_2CH_2-$.

22. The lubricating oil composition of claim 14, comprising from about 10 to 50 mole % of the polar acrylate.

23. The lubricating oil composition of claim 14, comprising from about 35 to about 70 mole % of the long chain acrylate of component b) and component c) together.

24. The lubricating oil composition of claim 14, wherein the ratio of short chain acrylate to long chain acrylate is about 0.3 to about 1.5.

25. The lubricating oil composition of claim 14, wherein
  $R^1$ is methyl or butyl;
  $R^2$ is lauryl-myristyl or lauryl;
  $R^3$ is cetyl-eicosyl; and
  A-X is 2-hydroxyethyl.

26. The lubricating oil composition of claim 25, wherein the $M_n$ is 2000 to 8000 g/mol and the ratio of short chain acrylate to long chain acrylate is about 0.1 to about 1.5.

27. The random copolymer of claim 1, wherein:
  $R^1$ is a linear or branched $C_1$ to $C_6$ alkyl radical;
  $R^2$ is a linear or branched $C_{12}$ to $C_{14}$ alkyl radical;
  $R^3$ is a linear or branched $C_{16}$ to $C_{20}$ alkyl radical; and
  A is a linear or branched $C_2$ to $C_6$ alkyl radical.

28. The random copolymer of claim 1, wherein each of $R^1$, $R^2$, $R^3$, and A are linear.

29. The lubricating oil composition of claim 14, wherein:
  $R^1$ is a linear or branched $C_1$ to $C_6$ alkyl radical;
  $R^2$ is a linear or branched $C_{12}$ to $C_{14}$ alkyl radical;
  $R^3$ is a linear or branched $C_{16}$ to $C_{20}$ alkyl radical; and
  A is a linear or branched $C_2$ to $C_6$ alkyl radical.

30. The lubricating oil composition of claim 29, wherein $R^1$, $R^2$, $R^3$, and A are linear.

* * * * *

UNITED STATES PATENT AND TRADEMARK OFFICE
CERTIFICATE OF CORRECTION

PATENT NO.         : 10,113,133 B2
APPLICATION NO.    : 15/138572
DATED              : October 30, 2018
INVENTOR(S)        : Jiang Ding and Joseph Remias Page 1 of 1

It is certified that error appears in the above-identified patent and that said Letters Patent is hereby corrected as shown below:

Claim 15, in Line 4 of Column 42, replace the number "1" with the number "14"

Signed and Sealed this
Eleventh Day of December, 2018

Andrei Iancu
*Director of the United States Patent and Trademark Office*